US009204194B2

(12) United States Patent
Liwerant et al.

(10) Patent No.: US 9,204,194 B2
(45) Date of Patent: *Dec. 1, 2015

(54) SHARING A STREAMING VIDEO
(71) Applicant: VideoShare, LLC, Chestnut Hill, MA (US)
(72) Inventors: Gad Liwerant, Chestnut Hill, MA (US); Christopher Dodge, Belmont, MA (US); Guillaume Boissiere, Scottsdale, AZ (US)
(73) Assignee: VideoShare, LLC, Chestnut Hill, MA (US)
( * ) Notice: Subject to any disclaimer, the term of this patent is extended or adjusted under 35 U.S.C. 154(b) by 132 days.

This patent is subject to a terminal disclaimer.

(21) Appl. No.: 13/852,425
(22) Filed: Mar. 28, 2013
(65) Prior Publication Data
US 2013/0212631 A1 Aug. 15, 2013

Related U.S. Application Data
(63) Continuation of application No. 13/175,685, filed on Jul. 1, 2011, now Pat. No. 8,434,123, which is a continuation of application No. 11/927,806, filed on Oct. 30, 2007, now Pat. No. 7,987,492, which is a continuation of application No. 09/803,243, filed on Mar. 9, 2001, now abandoned.
(60) Provisional application No. 60/188,082, filed on Mar. 9, 2000.

(51) Int. Cl.
H04N 7/173 (2011.01)
H04N 21/4782 (2011.01)
(Continued)
(52) U.S. Cl.
CPC .......... H04N 21/4782 (2013.01); H04M 3/567 (2013.01); H04M 7/0039 (2013.01); H04N 7/17336 (2013.01); H04N 21/23439 (2013.01); H04N 21/2743 (2013.01); H04N 21/2747 (2013.01); H04N 21/4223 (2013.01); H04N 21/4786 (2013.01); H04N 21/6379 (2013.01); H04N 21/8352 (2013.01); H04N 21/8586 (2013.01)

(58) Field of Classification Search
CPC .......... H04N 21/2343; H04N 21/2743; H04N 21/278
USPC ...................................... 725/86–115
See application file for complete search history.

(56) References Cited

U.S. PATENT DOCUMENTS 6,774,926 B1 * 8/2004 Ellis et al. .................. 348/14.01
7,562,300 B1 * 7/2009 Tobias et al. ................. 715/727

FOREIGN PATENT DOCUMENTS

WO    WO 0076220 A1 * 12/2000

OTHER PUBLICATIONS

RealVideo Content Creation Guide 1.0, 1997.*
(Continued)

Primary Examiner — Dominic D Saltarelli
(74) Attorney, Agent, or Firm — Schmeiser, Olsen & Watts, LLP

(57) ABSTRACT

A video segment can be shared over a computer network by first receiving the video segment at a receiving computer on the network. The receiving computer assures that the video segment is in a streaming video format, and creates at least one identification tag for the video segment. The receiving computer also stores the video segment, and communicates the identification tag to another computer on the network. Upon subsequent receipt of that identification tag, the receiving computer streams the video segment to a destination computer on the network.

22 Claims, 16 Drawing Sheets

| (51) | Int. Cl. | |
|---|---|---|
| | H04M 3/56 | (2006.01) |
| | H04M 7/00 | (2006.01) |
| | H04N 21/2343 | (2011.01) |
| | H04N 21/2743 | (2011.01) |
| | H04N 21/2747 | (2011.01) |
| | H04N 21/4223 | (2011.01) |
| | H04N 21/4786 | (2011.01) |
| | H04N 21/6379 | (2011.01) |
| | H04N 21/8352 | (2011.01) |
| | H04N 21/858 | (2011.01) |

(56) References Cited

OTHER PUBLICATIONS

"RealVideo Content Creation Guide" v1.0, Progressive Networks, Inc., Dec. 6, 1997.*

* cited by examiner

Embodiments of transmission formats:

1200 Standard email or HTML e-mail

1210 To: Host
1200 From: Client user
Subject: Name and
1230 Description
1240 Return address
Attachment (including video segment and audio file, or still images and audio files) also contains
1250 information as in HTML form.

HTML FORM
1300 or Web Page 1305 http://www.host.com
1310 Name:
1320 Return Address:
1220 Description
1340 Browse for File
Additional Information: This video is about my Uncle Sam, who was born on the Fourth of
1350 July, 1......
Services desired:
High Resolution
Add'l Copy on CD-ROM
Payment method:
Credit Card # XXXX-YYY

FIG. 1B

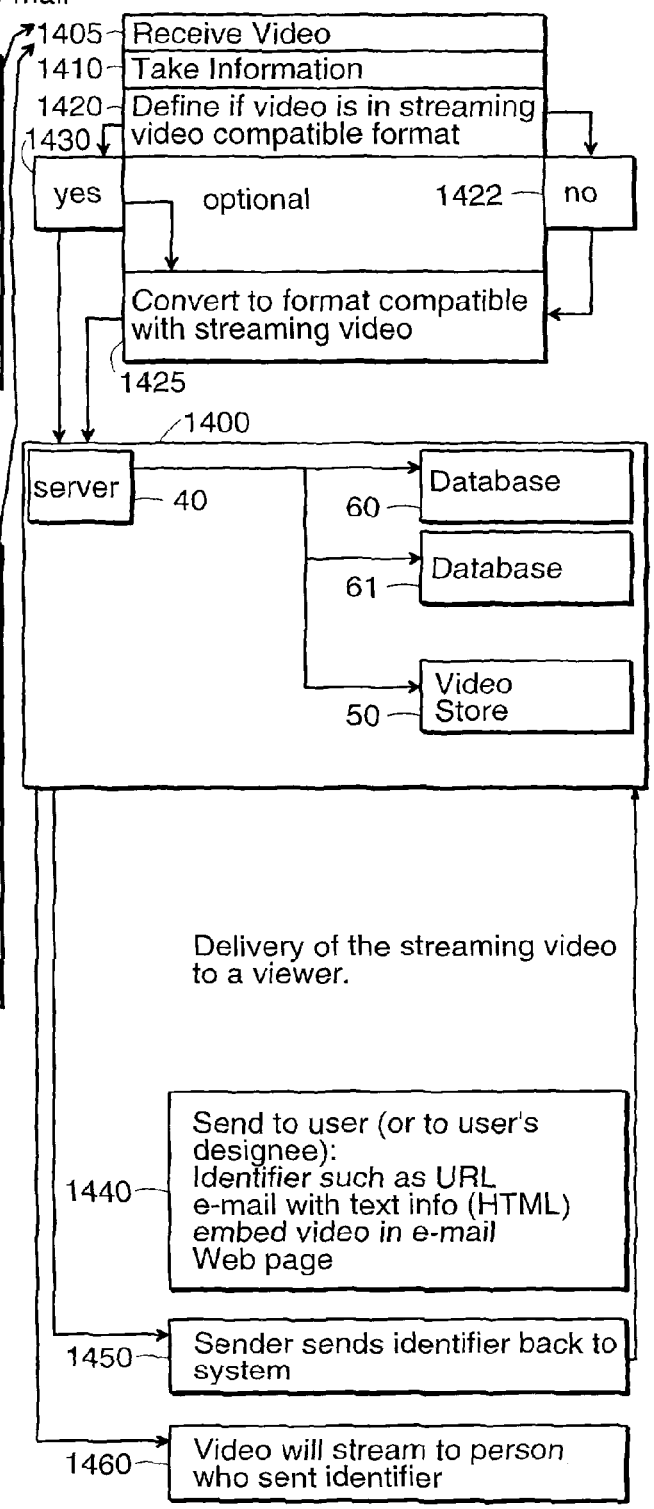

Upload and process:

1405 Receive Video
1410 Take Information
1420 Define if video is in streaming video compatible format
1430 yes / no
optional 1422
Convert to format compatible with streaming video
1425

1400
server — 40
60 — Database
61 — Database
50 — Video Store

Delivery of the streaming video to a viewer.

1440 — Send to user (or to user's designee):
Identifier such as URL
e-mail with text info (HTML)
embed video in e-mail
Web page 1450 — Sender sends identifier back to system 1460 — Video will stream to person who sent identifier FIG. 3   VideoShare Functional Diagram

SHARING A STREAMING VIDEO

RELATED APPLICATIONS

This application is a continuation application claiming priority to U.S. patent application Ser. No. 13/175,685, filed Jul. 1, 2011, titled "Sharing a Streaming Video", which is a continuation application claiming priority to U.S. patent application Ser. No. 11/927,806, filed Oct. 30, 2007, titled "Sharing a Streaming Video", now U.S. Pat. No. 7,987,492, issued Jul. 26, 2011, which is a continuation application claiming priority to U.S. patent application Ser. No. 09/803,243, filed Mar. 9, 2001, titled "Sharing a Streaming Video", now abandoned, which claims priority to provisional U.S. patent application Ser. No. 60/188,082, filed Mar. 9, 2000, titled "Sharing a Streaming Video", the entirety of which aforementioned applications are incorporated herein by reference.

FIELD OF THE INVENTION

This invention relates generally to the distribution of video segments. More particularly, the invention relates to sharing video in streaming video format over a network.

BACKGROUND

A video can be sent over a computer network as a file attachment to an electronic mail (e-mail) message. With this type of transmission, the entire video file must be transmitted and received before the receiver can view the video. For large files, the time required to complete such transmissions can be longer than the actual playing time of the video. Also, this type of transmission typically requires multiple computer programs to perform all of the necessary functions, including an e-mail application program to send or receive the video in computer file form, and a second program to play or display the video from the received file attachment. With this type of transmission, it is difficult to control the delivery time of the video, and it is difficult to share or forward the received video.

A video can be posted to a World Wide Web ("Web") page. In order to provide a video in this manner, a server computer connected to the Web must be used to host the Web site, and software packages must exist and be used to prepare the video, and transmit it over the Web using the File Transfer Protocol (FTP or ftp) or the HyperText Transfer Protocol (HTTP or http). To implement this type of video posting, at least a detailed knowledge of various computer communication protocols is required.

SUMMARY

It is an object of this invention to provide methods and systems for sharing video segments over a network. It is another object of this invention to provide a user with the ability to upload automatically a video segment over a network onto a server, without any specialized skill or knowledge on the part of the user. It also is an object of the invention to store the automatically uploaded video segment either on the server or remotely. The stored segment can then be streamed over the network, for example the Internet, to a destination computer such that a person at that destination computer can view the video segment.

In accordance with the present invention, full motion video can be automatically uploaded to a video server and then accessed by any number of viewers after each viewer has been provided with an identifier of the video. The video identifier can in general be an identification tag which identifies where and/or how the video can be accessed, for example a network address, or a universal resource locator ("URL"). The video can also be identified with an image that represents the content or subject matter of the video, so that the video can readily be identified when held in a collection of videos. Such identifiers as file names that are useful in a computer file processing, storage and retrieval system can further identify the video. In addition or alternatively, the invention can employ such identifiers as a file handle, a storage location, an interactive control, and a control object operating according to the Component Object Model (COM).

In one aspect, the invention relates to a method of sharing a video segment over a computer network. The network includes a receiving computer and a plurality of other computers including a destination computer. The method includes the steps of (a) receiving at the receiving computer the video segment sent over the computer network from one of the plurality of other computers; (b) performing automatically at the receiving computer, in response to a command received over the network, the steps of (b1) assuring that the video segment is in a streaming video format; (b2) creating at least an identification tag for the video segment to identify the video segment; (b3) storing the video segment under the control of the receiving computer in the streaming video format; and (b4) returning the identification tag to the one of the plurality of other computers; (c) receiving the identification tag at the receiving computer; and (d) in response to the receipt of the identification tag at the receiving computer, streaming the video segment in the streaming video format over the network to the destination computer.

In one embodiment, the method further includes causing the video segment to be displayed at the destination computer. In one embodiment, the video segment comprises an image with associated audio information. In one embodiment, the video segment comprises a still image. The computer network can include one of a wire connection, a cellular communication connection, a wireless networking connection, and a terrestrial satellite communication connection.

In one embodiment, step (a) comprises receiving the video segment which includes an identifier. In one embodiment, the identifier comprises a selected one of an image, a file handle, a storage location, an address, a Universal Resource Locator (URL), a file name, an interactive control, and a control object operating according to the Component Object Model (COM). In one embodiment, step (a) comprises receiving the video segment which is sent in association with an electronic mail message. In one embodiment, step (a) comprises receiving the video segment which is sent in association with a HyperText Markup Language (HTML) mail message. In one embodiment, step (a) comprises receiving the video segment which is sent in association with an upload form residing on a World Wide Web (Web) page. In one embodiment, step (a) comprises receiving the video segment which is sent in association with a File Transfer Protocol (FTP) transfer. In one embodiment, step (a) comprises receiving the video segment which includes information supplied by a sender at the one of the plurality of other computers. The information can include information describing a streaming format into which the receiving computer converts the video segment. The information can include an identification of the sender. In one embodiment, the identification of the sender comprises a proper name. In one embodiment, the identification of the sender comprises a username. In one embodiment, the identification of the sender comprises a password.

In one embodiment, the information comprises a return address of the sender. The return address can be an e-mail address. In one embodiment, the information comprises an identifier of the video segment. The identifier can be a title. The identifier can be a name. The identifier can be a date the video segment was produced. The identifier can be a location relating to the video segment. The identifier can be a subject relating to the video segment.

In one embodiment, the information comprises a comment about the video segment. In one embodiment, the information comprises a period of time during which the video segment will be available. In one embodiment, the information comprises information relating to a priority order of processing a video segment by the receiving computer.

In one embodiment, the information comprises an instruction for transmittal of a response. The instruction can include a formatting instruction. The instruction can include a speed of transmission. The instruction can include a transmission protocol to be used. The instruction can include a format of a physical medium to be used in sending a physical machine-readable copy of the video segment. The instruction can include a resolution of the video segment. The instruction can include an image quality of the video segment. The instruction can include a display format of the video segment on a destination computer.

In one embodiment, the information comprises financial information. The financial information can include a credit card number. The financial information can include a financial account identifier.

In one embodiment, step (b1) comprises converting the video segment, if it is not in a streaming video format at the time of receipt by the receiving computer, to a streaming video format, independent of a received command to perform such conversion. In one embodiment, step (b1) comprises automatically converting the video segment from a first streaming video format characteristic of the video segment upon receipt at the receiving computer to a second streaming video format.

In one embodiment, the method further comprises queuing a second video segment and a command transmitted with the second video segment for processing by the receiving computer according to steps (b) through (d) in the event that the receiving computer is performing any of steps (b) through (d) in response to receipt of a first video segment. In one embodiment, the method further comprises providing to a sender of a video segment an estimate of a duration of the required processing time for the conversion of the video segment. The estimate is provided prior to performing any of steps (b) through (d).

In one embodiment, the method further comprises providing to the destination computer of a video segment an estimate of a duration of the required processing time for the conversation of the video segment. In one embodiment, the video segment is converted into multiple video formats. The multiple video formats can include a format not compatible with streaming video. In one embodiment, the identification tag received by the destination computer is communicated by the receiving computer in association with one of an electronic mail message, an HTML electronic mail message, and an instant message. The identification tag can be a hyperlink provided in the message sent to the destination computer, the hyperlink pointing to a Web page that causes the streaming of the video. In one embodiment, the video segment in streaming video format is streamed from the receiving computer as information embedded in a message. In one embodiment, in response to the receipt of the identification tag at the receiving computer, the video segment in a first streaming video format is converted into a video segment in a second streaming format by the receiving computer, and the video segment in the second video format is streamed to the destination computer. In one embodiment, the receiving computer streams the video segment in a format of the available streaming video formats, the format based on a selected one of the receiving computer responding to user settings at the destination computer, the receiving computer responding to display software installed on the destination computer, the receiving computer responding to information received in association with the receipt of the identification tag, and the receiving computer determining an optimal viewing format for the destination computer of the formats available. In one embodiment, the receiving computer sends to the destination computer a video segment that is not in streaming format prior to the display of the video segment.

In another aspect, the invention features a computerized system for sharing a video over a computer network, comprising a receiving computer for communicating with one or more other computers over a computer network including a destination computer, the receiving computer receiving a video segment from at least one of the one or more other computers, the receiving computer responsive to a communication from the one or more other computers that can activate the receiving computer automatically, the receiving computer comprising: (i) a control module that controls a memory, the memory capable of holding computer instructions and data; (ii) a receiving module that receives a message associated with the video segment sent from the at least one of the one or more other computers; (iii) an analyzer module that determines whether the video segment is in a streaming video format; (iv) a format conversion module that converts a format of the video segment to a format that is compatible with streaming video; (v) a storage module that stores the video segment in streaming video format in the memory module; (vi) an identification module that creates the identification tag identifying the video segment in streaming video format stored in the memory module; (vii) a transmitter module that transmits over the network the identification tag to a computer of the one or more other computers; and (viii) a sharing module that streams the video segment in streaming video format to the destination computer in response to a return of the identification tag to the receiving computer.

In one embodiment, the system further comprises an extraction module that extracts from the received message the video segment and information sent with the video segment. In one embodiment, the information sent with the video segment comprises an identity of the user of the computer of the one or more other computers. In one embodiment, the information sent with the video segment comprises a return address of the user of the computer of the one or more other computers. In one embodiment, the information sent with the video segment comprises a title of the video segment. In one embodiment, the information sent with the video segment comprises an identifier of the video segment. In one embodiment, the information sent with the video segment comprises a subject of the video segment. In one embodiment the information sent with the video segment comprises a date of creation of the video segment. In one embodiment, the information sent with the video segment comprises a description of the video segment.

In one embodiment, the analyzer module that determines whether the video segment is in a streaming video format determines if the video segment is in QuickTime format. In one embodiment, the analyzer module that determines whether the video segment is in a streaming video format determines if the video segment is in ASF format. In one embodiment, the analyzer module that determines whether the video segment is in a streaming video format determines if the video segment is in WMF format. In one embodiment, the analyzer module that determines whether the video segment is in a streaming video format determines if the video segment is in MPEG format. In one embodiment, the analyzer module that determines whether the video segment is in a streaming format determines if the video segment is in Real Networks (Real) format. In one embodiment, the analyzer module that determines whether the video segment is in a streaming format determines if the video segment is in AVI format.

In one embodiment, the format conversion module that converts a format of a video segment from a format that is not compatible with streaming video to a format that is compatible with streaming video comprises a format conversion module that creates a Direct Show filter graph that decompresses the video file into an uncompressed AVI format file.

In one embodiment, the identification module that creates an identification tag identifying the video segment in streaming video format stored in the memory module comprises a module that selects a video frame from the video segment in streaming video format. In one embodiment, the identification module that creates an identification tag identifying the video segment in streaming video format stored in the memory module comprises a module that identifies a location where the video segment is stored. In one embodiment, the identification module that creates an identification tag identifying the video segment in streaming video format stored in the memory module comprises a module that identifies how the video segment can be accessed. In one embodiment, the identification module that creates an identification tag identifying the video segment in streaming video format stored in the memory module comprises a module that provides an image that represents the subject matter of the video segment. In one embodiment, the identification module that creates an identification tag identifying the video segment in streaming video format stored in the memory module comprises a module that generates a file name.

In one embodiment, the transmitter module that transmits over the network the identification tag to at least one computer of the one or more other computers comprises a module that transmits the identification tag using an electronic mail message communication protocol. In one embodiment, the transmitter module that transmits over the network the identification tag to at least one computer of the one or more other computers comprises a module that transmits the identification tag using a HyperText Markup Language (HTML) mail message communication protocol. In one embodiment, the transmitter module that transmits over the network the identification tag to at least one computer of the one or more other computers comprises a module that transmits the identification tag using an upload form residing on a World Wide Web (Web) page. In one embodiment, the transmitter module that transmits over the network the identification tag to at least one computer of the one or more other computers comprises a module that transmits the identification tag using a File Transfer Protocol (FTP) transfer.

In one embodiment, the sharing module that streams the video segment in streaming video format to one computer of the one or more other computers in response to a return of the identification tag comprises a module that streams the video segment to a specified computer. In one embodiment, the sharing module that streams the video segment in streaming video format to one computer of the one or more other computers in response to a return of the identification tag comprises a module that streams the video segment at a selected bitrate. In one embodiment, the sharing module that streams the video segment in streaming video format to one computer of the one or more other computers in response to a return of the identification tag comprises a module that streams the video segment at a selected transmission quality. In one embodiment, the sharing module that streams the video segment in streaming video format to one computer of the one or more other computers in response to a return of the identification tag comprises a module that streams the video segment at a selected performance level.

In one embodiment, the sharing module that streams the video segment in streaming video format to one computer of the one or more other computers in response to a return of the identification tag comprises a module that streams the video segment in a selected format.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and to the claims. The drawings are not necessarily to scale, emphasis instead generally being placed upon illustrating the principles of the invention. In the drawings, like numerals are used to indicate like parts throughout the various views.

FIG. 1B shows illustrative embodiments of the invention, and describes the activities that occur in the various components.

DETAILED DESCRIPTION

In the description presented below, there are references to software and software modules. One of ordinary skill in the computer arts understands that any functionality that can be operable by the use of software can also be made to operate by the use of firmware, such as software, commands, logic or data encoded on a chip, and equally by the use of hardware, such as a hard-wired circuit that is designed to perform a specific task. It is also possible to provide some of the functionality by use of software modules, and some of the functionality by use of firmware modules and/or hardware modules. In general, a module is an assemblage of one or more parts of software, firmware, and/or hardware that accomplishes a defined function or task.

Figure 1A:
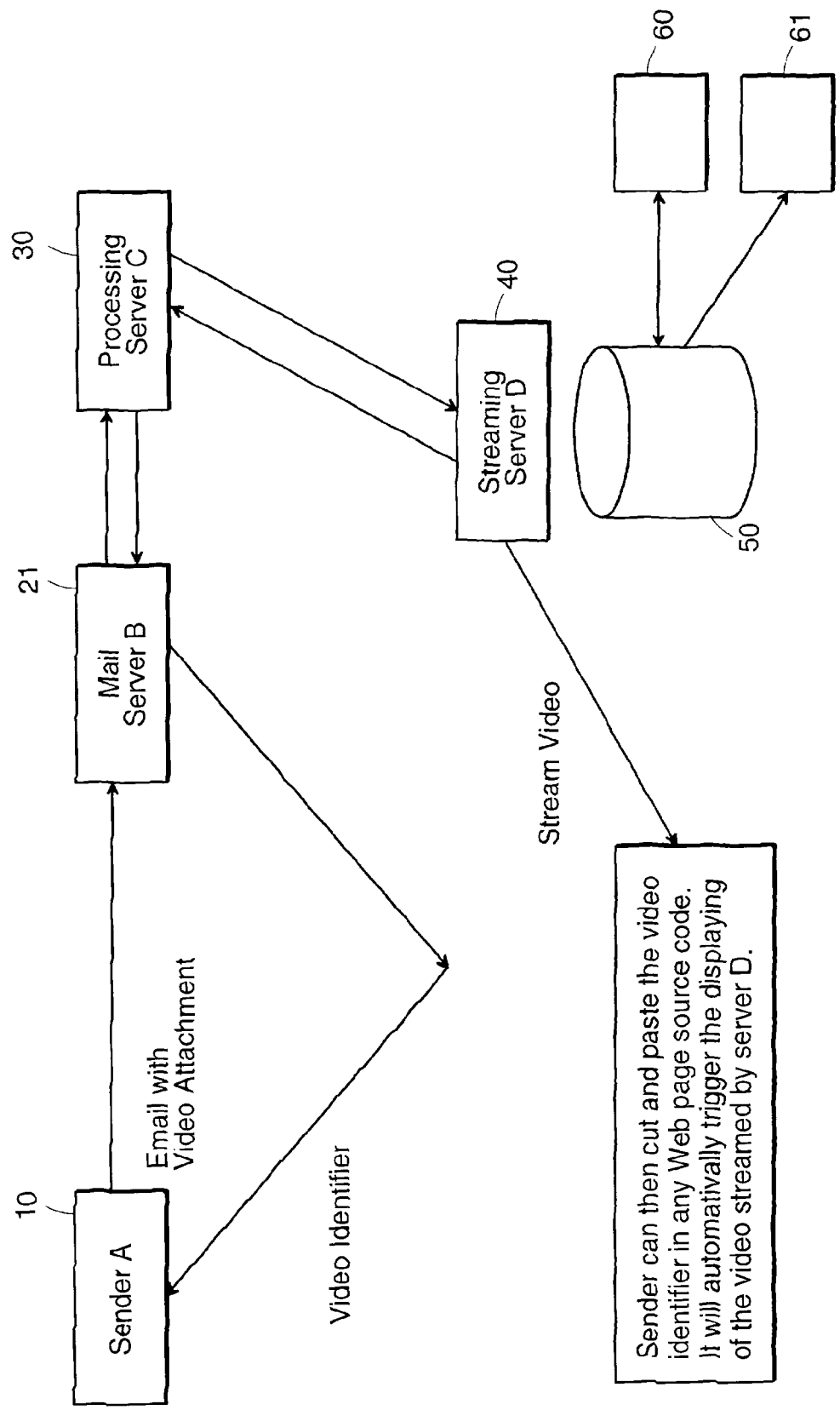
FIG. 1A is a diagram of an embodiment of the invention, showing the relationships between the components and their interactions with each other and with a sender and a viewer.

Turning to FIG. 1A, a sender ("sender A") using a computer 10 sends a video segment in file form and any associated audio material (or a plurality of still images with their associated audio files) as, for example, an e-mail attachment to an e-mail message from sender A's computer 10 over a network (such as the Internet or over any other communication medium that sender A's computer 10 can employ) to a mail server B 21. The network can include one or more of a wire connection such as a hardwired connection, a cable connection using RS232, RS422 or RS 485 technology, and telephonic connections or cable connection using a modem. The network can include one or more wireless connections such as a cellular communication connection, an infrared connection, a wireless Local Area Network (LAN) and Bluetooth technology. The network can include a terrestrial satellite communication connection.

The mail server B 21 performs various parsing and file recognition processes, described in greater detail below. The mail server B 21 is in bidirectional communication with a processing server C 30. The functions of the mail server B 21 can be performed by one or more server computers, and the functions of the processing server C 30 can be performed by one or more server computers. In some embodiments, the mail server B 21 and the processing server C 30 can be implemented on the same one or more server computers.

The processing server C 30 performs various video and file conversion and identification processes, described in more detail below. The processing server C 30 is in bidirectional communication with a streaming server D 40. The functions of the streaming server D 40 can be performed by one or more server computers. The streaming server D 40 receives the video in streaming video format from the processing server C 30, and returns to the processing server C 30 at least one video identifier that can be used to request the video to be streamed to a viewer. The streaming server D 40 includes machine-readable storage 50, such as one or more of a hard disk, a CD-ROM, and a semiconductor memory. The machine-readable storage 50 (a single example of which is shown for simplicity) is in communication with one or more databases 60, 61 (only two of which are shown for simplicity). Each of machine-readable storage 50 and the databases 60, 61 can be local or remote, in that each can be implemented as a component that is connected directly to the streaming server D 40, or each can be connected to the streaming server D 40 by way of a network The streaming server D 40 also creates one or more identifiers for the video file. The identifiers, which are discussed in more detail below, can include, for example, one or more of an image identifier (for example, a "thumbnail" or iconic image), an identification tag, a file handle, a storage location, an address such as a Universal Resource Locator (URL), a file name, or an interactive control, or a control object operating according to the Component Object Model (COM), for example an Active X control. The streaming server D 40 transmits the video in streaming video format to the machine-readable storage 50, which, at the direction of the streaming server D 40, can store the video in streaming video format and also can store an identification tag for the video on itself or on the databases 60, 61. The identification tag, or another identifier of the video, such as the thumbnail and/or the URL, is communicated back to the sender A's computer 10 by way of one or more of the streaming server D 40, the processing server C 30, and the mail server B 21. The operator of sender A's computer 10 can then use the identifier to request that the video be streamed to sender A's computer 10 for viewing, and/or the operator of sender A's computer 10 can provide the identifier to another viewer, for example, by way of a Web page, or by an e-mail. In one embodiment, the identification tag can be embedded in a Web page so that a visitor to the Web page can activate the identification tag, such as a link to a URL, and can transmit to the receiving computer the information required to cause the streaming of the video segment to the computer of the Web page visitor for viewing. In the case of an identifier such as a URL, the operator of sender A's computer 10 additionally can communicate the identifier orally or in writing to another viewer. The other viewer can then use the identifier to request that the video be streamed from the streaming server D 40 to his or her computer for viewing.

Turning to FIG. 1B, the system and method are described in more detail in a number of alternative exemplary embodiments. The video sent by sender A's computer 10 (whether sent by e-mail, by HTML message, by use of a Web page, or by some similar or other mechanism operating over a network) can include additional information provided by the user of sender A's computer 10. This additional information includes, but is not limited to, the identification of the user of sender A's computer 10 (such as a proper name or a username and password registered with the server computer), the electronic return address of the user of sender A's computer 10 (such as an e-mail address), a title or an identifier for the video (such as a name, a date produced, a location, or a subject relating to the video that the user of sender A's computer 10 will recognize), a description of the video and/or other comments by the user of sender A's computer 10 about the video, a description of how a response should be transmitted and/or formatted (e.g., e-mail, Web page containing the video, HTML e-mail with the video embedded, and the like), and any other information that may help to identify the user of sender A's computer 10 and/or the video.

In an embodiment in which the video is submitted by standard e-mail or HTML e-mail 1200, the information that the user of sender A's computer 10 provides is in general standard information that the e-mail format supports. The identity 1220 of the user of sender A's computer 10 and the return address 1240 of the user of sender A's computer 10 is automatically provided as part of the e-mail. The title or identifier of the video (e.g., name and subject matter) 1230 preferably can be provided as the subject of the e-mail, or alternatively within the body of the e-mail, or as an attachment such as a text file. The description of the video and/or other comments by the user of sender A's computer 10 preferably can be provided in the body of the e-mail. Alternatively, the description and/or other information related to the video or to the user of sender A's computer 10 can be provided as part of the subject line of the e-mail, in the body of the e-mail message, or as an attachment to the e-mail message. The video (and optionally audio) material is sent as an attachment 1250 to the e-mail. The recipient of the e-mail and attached video appears as the addressee 1210.

In another embodiment in which the video is submitted by HTML form or message 1300, or by use of a Web page, the server computer 1400 provides a form which has specific interactive spaces or dialog boxes for each piece of information, including the identity of the user of sender A's computer 10 and the return address 1320 of the user of sender A's computer 10, the title of the video 1310 and/or identifier of the video, and the description 1330 of the video and/or other comments. The HTML message or the Web page can also have space for additional information 1350, as well as optional information that the user of sender A's computer 10 desires to submit.

The additional information can include, but is not limited to, payment information (e.g., credit card number, account number, or the like), specifications such as resolution and/or image quality desired by the user of sender A's computer 10, and optional services desired, such as the provision of the files in some additional optional form, such as recorded on CD-ROM and sent to the user of sender A's computer 10 by postal service.

The optional information can also include information indicating the streaming video format that the video segment should be converted into, information about the resolution, transmission bitrate, and video quality of the streaming video format that is desired, and a period of time that the video segment should remain available. In one embodiment, an instruction includes a display format of the video segment to be displayed on a destination computer, such as information about the size of the display in pixels or in linear measure such as inches or centimeters, information about what portion of the screen is to be used, such as the location on the screen, or whether the full-screen is to be used, and the like. In one embodiment, the sender A using computer 10 is able to set priorities about which video segments should be processed first by the receiving computer. The form can include a browse button 1340 that allows the user of sender A's computer 10 to browse a drive and its directories/subdirectories or other file storage location to more easily locate a file to be sent. The browse button 1340 also activates a series of computer commands that automatically retrieve and attach the file to be sent to the HTML form.

In an embodiment (not shown) in which the video is submitted by FTP, the server computer 1400 parses the various parts of the FTP message, for example by identifying images as one of the various image file formats, by identifying audio files as one of the many audio file formats, and by identifying and parsing text files.

The system and method include functions that take place at the server computer 1400 in FIG. 1B. The server computer 1400 can be implemented using one or more server computers. The capabilities that the server computer 1400 provides include all of the capabilities of the mail server B 21, the processing server C 30, the streaming server D 40, the machine-readable storage 50, and the databases 60, 61 described in FIG. 1A. These capabilities include, but are not limited to, performing the functions of: receiving the transmission of a video file, optionally with one or more audio files, in e-mail, HTML message, Web page format, or FTP upload to the server computer ("receive information" at box 1405); extracting from the received message the video and all of the information sent with the video, including but not limited to, the identity of the user of sender A's computer 10, the return address of the user of sender A's computer 10, the title of the video or identifier of the video (such as subject, place, date, or the like), the description and/or other comments, optional additional information, as well as information that the user of sender A's computer 10 desires to submit ("take information" at box 1410). The server computer 1400 performs functions that are described in detail in the discussion below with respect to one or more computer programs, (collectively) called the VideoShare Producer, that operate on a user's computer, such as a personal computer. In the present invention, many of the functions described in detail for the VideoShare Producer are performed by one or more computer programs that operate on the server computer 1400. These functions, steps, or operations include, but are not limited to: determining whether the video is already in a format compatible with streaming video ("define if video is streaming compatible format" at box 1420); if the video is not in a format compatible with streaming video, automatically converting the video into a format that is compatible with streaming video (No at box 1422 and "convert to format compatible with streaming video" at box 1425); passing the video to the next process step if it is already in streaming video format (Yes at box 1430); optionally compressing the video in streaming video format; creating an identification tag for the video in streaming video format; storing a copy of the video in streaming video format in an archival machine-readable storage 50; recording in a database 60, 61 the identification tag and the storage location of the stored copy of the video in streaming video format for later retrieval; creating one or more identifiers, such as a "thumbnail," a URL, a file handle, or a file name for the video and recording the one or more identifiers; sending at least one of the one or more identifiers to sender A's computer 10 of the video at box 1440; and upon a request in the form of a return of the identifier back to the server at box 1450, serving the video in streaming video format in response to the request at 1460 to the source of the request. In another embodiment, the request to stream the video segment comes from a computer other than that of the sender A of the video segment, and the streaming video is then served to the computer other than that of the sender A. In addition to the processes just described, the methods and systems of the invention can also convert the video segment from a first streaming video format to a second streaming video format, differing from the first streaming video format in at least one of a file format, an encoding scheme, a resolution, an image quality, a transmission rate, and a file size. In some embodiments, a video segment is converted into a plurality of different formats, differing in one or more of the properties enumerated above, such as the file format, the file transmission quality and bitrate, and the like. In some embodiments, the conversion of a video segment from one streaming video format to a different streaming video format is performed in response to a request for the video segment to be streamed in a specific format.

The discussion below describes how a video can be examined to determine if it is or is not in a format compatible with streaming video format. The discussion below describes the kinds of conversion that are done to convert a video that is not in a format compatible with streaming video format to a format that is compatible. The discussion below describes the optional compression of a video segment. The discussion below describes the creation of an identification tag for a video and the use of the identification tag. The discussion below describes storing a video in uncompressed or in compressed streaming video format, either locally or remotely from the storage of the server computer. The discussion below describes recording in a database the identification tag and the storage location of the stored copy of the video in streaming video format for later retrieval. The discussion below describes creating one or more identifiers for the video and recording the one or more identifiers. The discussion below describes sending at least one of the one or more identifiers to the sender of the video. The discussion below describes serving the video in streaming video format in response to requests to serve the video.

In communicating over a network, a file can be transmitted along with information about the file between computers either through an e-mail attachment, by using an FTP client-server program, or by using an upload mechanism placed on the Web. In one embodiment, the systems and methods of the invention can optionally convert a video in one streaming video format to a second streaming video format, as indicated by the arrow labeled "optional" that points from box 1430 to box 1425. In one embodiment, if the segment is not in streaming format at the time it is received by the receiving computer, the receiving computer will automatically convert it into streaming format. In one embodiment, even if the video segment is in streaming format upon receipt at the receiving computer, the receiving computer automatically converts the video segment into another streaming video format. In some embodiments, the video segment can be converted into multiple video formats, including both formats compatible with streaming video and formats not compatible with streaming video. In some embodiments, the destination computer is notified that the segment is available in more than one format and that a user of the destination computer can select whichever format is preferred for the transmission.

In the case where the video segment is available into multiple formats at the receiving computer, the format that will be used in streaming the video segment to the destination computer can be selected based on criteria that exist at the destination computer, including the possibility that the video segment should be downloaded to the destination computer in a non-streaming format, and then displayed at the destination computer when the entire video segment has been downloaded.

While a viewer can select a video format, in the event that the viewer does not know which format to select, or in the event that a better viewing experience would result, a suggested format can be communicated to the receiving computer from the destination computer. Example of such communications can include a default viewer setting, such as a default ASF format, if available, and a secondary preference for a QuickTime format. In another embodiment, the receiving computer makes a format recommendation to the destination computer along with the transmission of the identification tag. Such a recommendation can, for example, be a communication that of the various streaming video formats available (which can be enumerated) a particular format is suggested as the preferred format. The receiving computer can also determine a format for streaming a video segment in response to information that the receiving computer obtains about the display software that is installed on the destination computer, and the receiving computer can then recommend a format for which the destination computer already has display software. Another alternative is to determine a streaming video format that will provide an optimal viewing quality. Viewers who do not have appreciable technical information regarding streaming video formats will be afforded guidance as to which one to use. This format detection mechanism is very similar to the speed detection mechanism described elsewhere in this application.

The systems and methods of the present invention use convention methods for such activity. The system and method of the present invention extract from the received message the video and all of the information sent with the video, including but not limited to, the identity of the sender (e.g., the user of sender A's computer 10), the sender's return address, the title or identifier of the video, the description and/or other comments, optional additional information, as well as information that the sender desires to submit. In general, if one has knowledge of the syntax of the message that one has received, it is possible to parse the message into its component parts. In an embodiment that relies on conventional transmission formats, such as e-mail, the message is parsed into the component parts according to a set of parameters that correspond to the default encoding of the message format. If such parsing fails to disclose one or more components, a second more specialized computer program can search for a string that corresponds to a title or identifier. For example, if the subject line is blank, there appears to be no sender-supplied title or identifier, and the more specialized program could look for a string having a format like "(words) at (words)," such as "(My family) at (the beach)," or the like. In an embodiment such as an HTML or Web page form, the parsing is direct in that each dialog box has a prompt that the sender responds to, and the content of each box is taken to be the requested information. The server computer can check some of the information provided, such as an e-mail address, for example by inquiring of the Internet Service Provider (ISP) server whether the address is valid. Information that is optional, or information such as a title for a video, can be accepted without the necessity to confirm the accuracy or validity of the information.

The server computer 1400 operates on the received message with the video in the following manner, irrespective of whether the message is in e-mail, HTML mail, HTML Web page submission format, or FTP. The server computer 1400 recovers the video and each of the pieces of information from the message. The server computer 1400 determines if the video is in a format compatible with streaming video, or not. If not, the server computer 1400 converts the video into a format compatible with streaming video format. The server computer 1400 takes that form of the video that is compatible with streaming video format and optionally performs compression of the video. The server computer 1400 takes the video in format compatible with streaming video format, in uncompressed or optionally compressed condition, and creates one or more identifiers, which can include a "thumbnail" image (described in the discussion below), a file name, a handle and the like, as well as other identifiers such as a description of the video. The server computer 1400 creates an identification tag, which it uses to identify the uncompressed or optionally compressed video in streaming video format for storage and retrieval purposes. The server computer 1400 stores the uncompressed or optionally compressed video in streaming video format locally or remotely in an archives The server computer 1400 stores in a database the identification tag and the location of the uncompressed or optionally compressed video in streaming video format. The server computer 1400 sends to the sender one or more of the identifiers of the video. The identifiers can be sent to the sender in one or more different formats, including an identifier such as a Universal Resource Locator (URL) that is associated with the stored uncompressed or optionally compressed video in streaming video format; an e-mail with information relating to the location and/or command required to request that the video be streamed; the command to stream the video embedded in an e-mail or a HTML message; the command to stream the video embedded in a Web page, and the like. The information sent to the sender can include the "thumbnail" image for ease of identification of the video and its subject matter.

In some embodiments, if the receiving computer is already processing a video segment at a time that another video segment is received, the second video segment and associated commands is queued to be processed later. This involves queuing the video segment and any commands associated with the video segment in a storage location under the control of the receiving computer. In some embodiments, if video segments are queued under the control of the receiving computer, the video segments can be processed in an order based on a priority set by the sending computer, a priority set by the receiving computer, or according to any other priority scheme, such as a calculation performed using an algorithm, that is implemented on the receiving computer.

In some embodiments, the sender or the intended recipient at a destination computer is notified of an estimate of how long the processing of a video segment is going to take, before the video segment is actually processed. The notification can be provided by any method, such as by a return email sent upon receipt of the video segment at the receiving computer. As those familiar with the processing of video segments will appreciate, converting a video into streaming format can be time-consuming, and if many computers submit their videos at the same time, some requests for service may take some time to process by the receiving computer. In this case, it is important to be able to notify the sender or the destination computer of an approximate amount of time that providing the required service will take. This is similar, but by no means identical, to phone systems in which a caller is notified of the approximate waiting time until the next operator will be available to respond to a call. In a system where a caller waits for a response by a human operator, who speaks with other callers, there is only a statistical possibility of defining a waiting time, because any call may be longer or shorter than an average, or expected, duration. In the methods and systems of the invention, a calculated estimate of a processing time can be provided based on the file size and the format of a video segment. For example, knowing the processing speed of a CPU, and an estimate of the time or the number of processing operations required to convert a file of a predetermined format and size, a file having a given size of the same format could be expected to require a time proportional to the ratio of the file sizes, to a first approximation.

In some embodiments, the identification tag is communicated to the destination computer by the receiving computer in association with one of an electronic mail message, an HTML electronic mail message, and an instant message, such as a message communicated among members of an affinity group of computer users who are contemporaneously on-line. In one embodiment, the identification tag is an hyperlink provided in the message sent to the destination computer, the hyperlink pointing to a Web page that causes the streaming of the video.

The sender of the video can request that the video be streamed to the sender, and the sender can additionally, or alternatively, provide the information needed to request the server to stream the video to one or more other viewers. When the sender of the video, or a party who has been given the requisite information, sends to the server computer a request to stream of the video, the server computer streams the video to the requester. It can also automatically submit the video to a third party service including but not limited to on-line auctions, on-line resume services, on-line dating services, or on-line customer support centers.

Figure 1C:
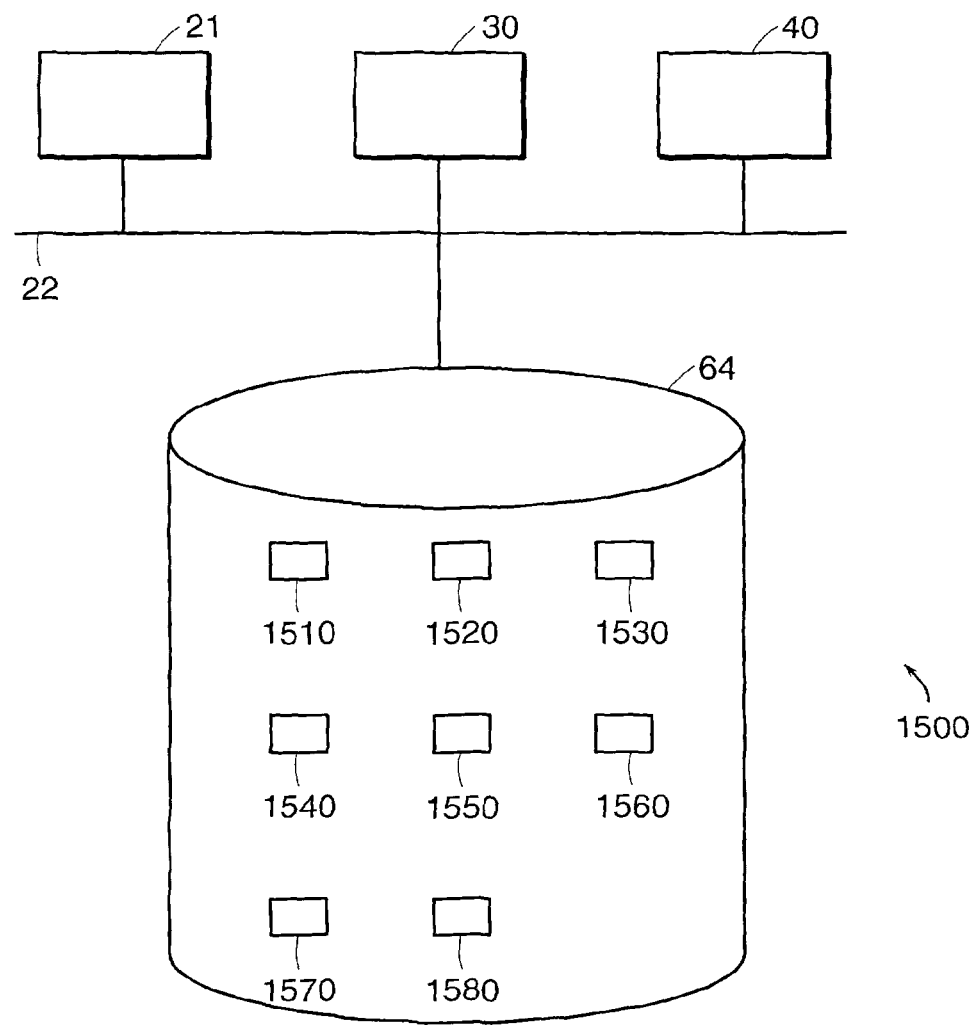
FIG. 1C is a diagram showing software modules that are resident on one or more of the mail server B 21, the processing server C 30, and the streaming server D 40, according to an embodiment of the invention.

FIG. 1C is a diagram 1500 showing software modules that are resident on one or more of the mail server B 21, the processing server C 30, and the streaming server D 40. The software modules perform specific tasks. The servers 21, 30, 40 are interconnected by a network 22 with a machine-readable memory, such as storage array 64, upon which software, including software modules, can be recorded and retrieved for use by the servers 21, 30, 40. The software modules are described below.

A control module 1510 controls a memory, which can be any conventional machine-readable memory such as RAM, magnetic memory, or optical memory. The control module 1510 can store and retrieve information from the memory. The memory is capable of holding computer instructions and data, and as indicated above, can be located locally with respect to any of the servers, or remotely from the servers, but in any event the memory is accessible over the computer network 22.

A receiving module 1520 can receive both a video segment and an associated message. The video segment and the associated message can be sent from any one of the one or more other computers in the network 22 with which the servers 21, 30, 40 communicate. The receiving module 1520 can determine that the video segment and the associated message have been received correctly, and that the files are complete, for example by use of error detection and correction technology such as cyclic redundancy checking (CRCs) and coding.

An analyzer module 1530 determines whether the received video segment is in a streaming video format. The determination of a format can be carried out by comparing the format to known format characteristics and format identifiers. The analyzer module 1530 can determine whether the format of the video segment is a particular format including, but not limited to, such formats as QuickTime format, ASF format, WMF format, MPEG format, a Real Networks (Real) format, an AVI format, an uncompressed AVI format, and formats not compatible with streaming video.

A format conversion module 1540 converts a format of the video segment to a format that is compatible with streaming video. The format conversion can be a conversion from a format not compatible with streaming video to a format compatible with streaming video, a conversion from a format not compatible with streaming video to a different format not compatible with streaming video, a conversion from a format compatible with streaming video to a different format compatible with streaming video, or a conversion from a format compatible with streaming video to a format not compatible with streaming video. The format conversion can be performed by subjecting a file having a known format to a transformation that prepares an additional file encoded according to a second known format. Such transformations are generally algorithmic in nature.

A storage module 1550 stores the video segment in streaming video format in the memory that is under the control of the servers 21, 30, 40, control being exerted by way of the control module 1510.

An identification module 1560 creates an identification tag identifying the video segment in streaming video format that is stored in the memory. As indicated below, the identification tag can take many forms, including a hyperlink provided in the message sent to the destination computer, the hyperlink pointing to a Web page that causes the streaming of the video. The identification module 1560 can select a video frame from the video segment in streaming video format as an identification tag. The identification module 1560 can identify a location where the video segment is stored. The identification module 1560 can identify how the video segment can be accessed. The identification module 1560 can provide an image that represents the subject matter of the video segment.

The identification module 1560 can generate a file name.

A transmitter module 1570 transmits over the network 22 or another network such as the Web the identification tag to a computer of the one or more other computers. The transmitter module 1570 can transmit the identification tag using an electronic mail message communication protocol. The transmitter module 1570 can transmit the identification tag using a HyperText Markup Language (HTML) mail message communication protocol. The transmitter module 1570 can transmit the identification tag using an upload form residing on a World Wide Web (Web) page. The transmitter module 1570 can transmit the identification tag using a File Transfer Protocol (FTP) transfer.

A sharing module 1580 streams the video segment in streaming video format to the destination computer in response to a return of the identification tag to the receiving computer. The video segment is streamed over the network 22 or another network such as the Web. The sharing module 1580 can stream the video segment to a specified computer. The sharing module 1580 can stream the video segment at a selected bitrate. The sharing module 1580 can stream the video segment at a selected transmission quality. The sharing module 1580 can stream the video segment at a selected performance level. The sharing module 1580 can stream streams the video segment in a selected format.

In this document there are references to methods and systems that operate on the computer of the user. There are references to software called Videoshare Producer that operates on the computer of a user. It should be understood that any system, process or capability that can be carried out on the user's computer in relation to the VideoShare Producer software can equally well be carried out on a host computer that includes one or more server computers that communicate over a network such as the Web with other computers. That is, any process performed on a user computer by software such as the VideoShare Producer can also be performed on a host computer that includes servers.

This document makes reference to processing of a video file on the user computer before the video file is uploaded to a host computer. It should be understood that it is also possible to upload the video file without performing all of the processing described at the user computer, but rather performing the processing at the host computer after the video has been uploaded.

Figure 1D:
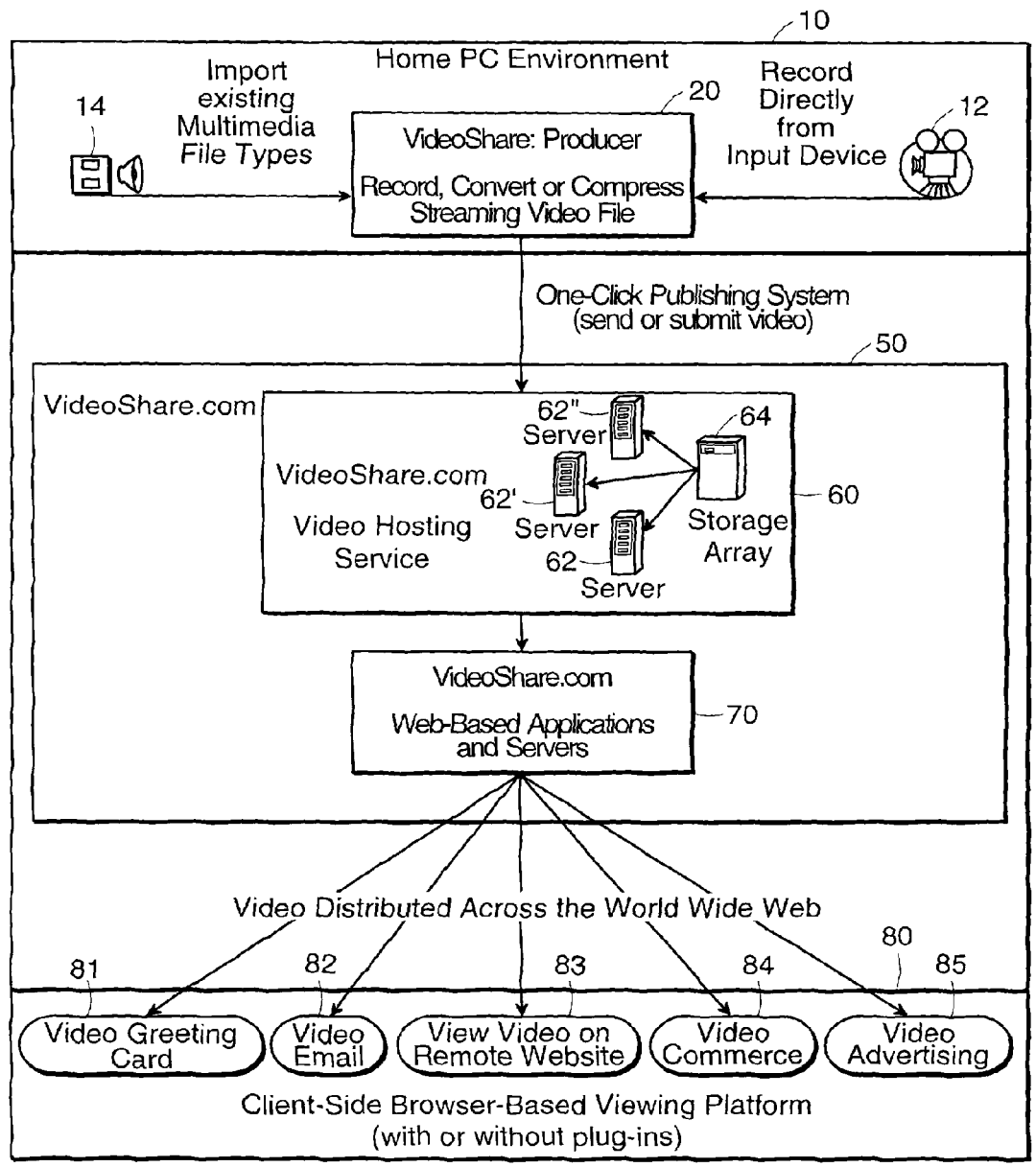
FIG. 1D shows an embodiment of a process and system according to the invention.

Referring to FIG. 1D, a user of the system, such as a private individual working from home, or a professional working from a business, employs a computer system 10. The computer system 10 can include a computer which can be a personal computer of conventional type such as a desktop or laptop computer, a hand held device such as a PDA, or a more powerful computer such as a workstation, a server, a minicomputer, a mainframe, or the like. The computer system 10 can operate software including a web browser such as Microsoft Internet Explorer or Netscape Navigator or Communicator or the like, for communication over a network such as the Internet using the World Wide Web (hereinafter "the Web"), or to permit wireless communication. The computer system 10 can operate software that can manipulate video segment files. The computer system 10 can communicate with video sources, such a video cameras and video recording machines, if the user wishes to employ such sources. Conventional commercially available personal computers typically have sufficient capability to meet these requirements. The computer system 10 can also employ video segments generated digitally by the computer and appropriate software, or by another computer, if the user wishes to employ such techniques. In one embodiment, the computer system 10 operates a software package called VideoShare Producer 20, which will be described and explained in more detail below.

The VideoShare Producer 20 is a software application package that the user can download from the Web site www.VideoShare.com 50 or that the user can obtain in other formats such as on a CD-ROM or bundled with other software or hardware. The VideoShare Producer 20 software can be operated by the user under his control on his computer, in the computer system 10, in order to provide the capability of recording, converting, and optionally, compressing video segments, creating one or more identifiers for a video segment, and transmitting a video segment with one or more of the identifiers to a host computer 60 operating under the control of a host such as www.VideoShare.com 50 for storage at a location under the control of the host computer 60. The host computer 60 will be described further below.

The computer in the computer system 10 of the user one can be connected to one or more kinds of equipment for generating video segments, such as a video camera such as a Web cam 12 or another type of video camera such as a professional quality video camera. The computer in the computer system 10 of the user can be connected to one or more kinds of equipment for providing prerecorded video segments, such as a video recorder 14, or another computer that can create digital video segments through the use of suitable software, such as for example digital video segments that have been created for various commercial films, or the like. Once the user has obtained a video segment, and has manipulated it according to the procedures described below with regard to the operation of the VideoShare software package, or its equivalent, the video segment with one or more identifiers is transmitted to the host computer 60.

The host computer 60 includes one or more server computers 62, 62', 62" that communicate over a network such as the Web with other computers, such as the computer in the user's computer system 10. The one or more server computers 62, 62', 62" also communicate with a storage array 64, or optionally with a plurality of storage arrays substantially similar to storage array 64. The storage array 64 can be any convenient storage system, such as a redundant array of magnetic storage disks, one or more readable and writeable CD-ROMs, random access semiconductor memory, any combination of such storage devices, or the like. In one embodiment, the host computer 60 operates the www.VideoShare.com 50 Web site, and provides a video hosting service to one or more users. The host computer 60 can connect over the Web and the web site www.VideoShare.com 50 to one or more computers that comprise the Web, conceptually denoted by the box 70, which, while not a part of the www.VideoShare.com 50 Web site, appears to be transparent to users of the www.VideoShare.com 50 Web site, as well as to viewers of video segments that are being hosted by the host computer 60.

Viewers, or individuals who desire, or are invited, to view video segments hosted on the host computer 60, can access video segments hosted on the host computer 60. As will be described in more detail below, in one embodiment, video segments can be hosted on host computer 60 in areas that are open to the public, or can be hosted in other areas that are open only to viewers who have the appropriate permission or authorization to view a specific video segment. A hosted video segment that is stored and controlled by the host computer 60 may be delivered to and displayed for a viewer in a variety of formats, and through a variety of methods, as denoted generally by the box 80. In different embodiments, a video segment can be displayed as: a video greeting card 81, such as a person wishing another a happy birthday; as video email 82, as video that can be viewed on a remote website 83 (e.g., a video segment embedded into the remote website so that a viewer who visits the remote website sees the video segment as part of the page that is presented); as video commerce 84, for example a video that depicts a person describing his or her experience and training as part of a resume submitted on-line; or as a video advertisement 85, for example a video depicting the benefits or showing the use of a product. Many other like applications of the technology can be envisioned. In various embodiments, the video segment can be made available to the viewer as a streaming video that is sent to the viewer, or may be made available by sending the viewer a message such as an email that contains an address of a location to visit on the Web (e.g., a Universal Resource Locator, or URL), or may be made available by sending the viewer a message that contains an embedded link to a URL, for example by sending an e-mail containing the link or by sending a still image that may have some interest to a viewer (e.g., sending a grandmother a still image of her grandchildren) to which a link is attached (e.g., the still image is linked to a streaming video of the grandchildren that is delivered and that plays when the still image is clicked). In the latter two methods of making a video segment available, or in like methods, the viewer must take some action, such as employing the URL or activating the link. In some embodiments, the viewer can use a hand held device such as a PDA or a cellular telephone that can connect to a network such as the Internet to view the video segment.

Figure 2:
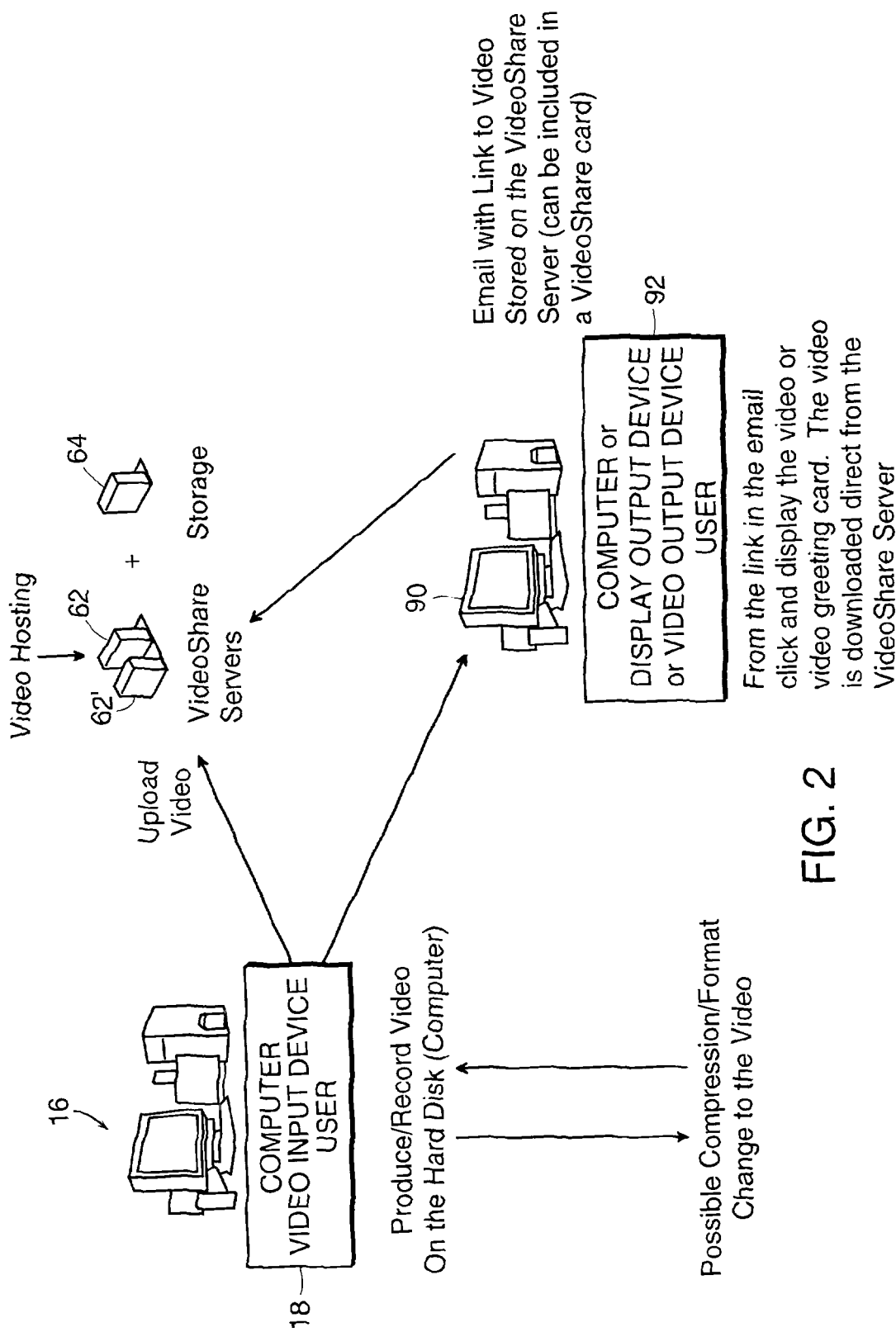
FIG. 2 is an embodiment of a system according to the invention, including the interactions and interrelationships within the system.

In FIG. 2, the computer 16 of the user's computer system 10 is shown. The box 18 is intended to schematically depict a user of a computer video input device, which device can be the computer 16 operating suitable software to generate digital video, or can be another such computer, or can be the web cam or video camera 12, or can be the video recording device 14, or the like. The user begins by producing and/or recording a video segment on the hard disk of the computer 16 or within the temporary memory of a handheld device. As a second step, the video segment of step 1 can optionally be compressed and/or can be changed as regards the computer file format in which it is recorded on the hard disk. As a third step, the video segment recorded on the hard drive of the computer 16 is transmitted with one or more identifiers to the host computer 60 that includes the VideoShare servers 62, 62' and the storage array 64. The video segment is stored under the control of the host computer 60, which can generate an identification tag that the host computer 60 can use to locate the stored video segment for retrieval and for viewing. In different embodiments, the identification tag can be provided to a user in the form of a URL, or can be embedded into a Web page on a remote site, or can be linked to a message. In one embodiment the message can be a still image that can be selected from the video segment. The third step is schematically depicted by the arrow pointing generally from the computer 16 to the VideoShare servers 62, 62'. As a fourth step, the user who stored the video can send a message to an intended viewer, so that the viewer can access and view the video segment. The fourth step is schematically depicted by the arrow pointing generally from the computer 16 to the computer 90 of the viewer. The box 92 is intended to schematically depict a user of a display device. In one embodiment, the display device can be the computer 90, or the display device can be a display device such as a Web TV, or can be a video output device such as a television set with a suitable decoder, or the like. The display device can also be a wireless hand held device such as a PDA or a cellular telephone or the like. In a fifth step, the viewer activates the viewing of the video segment. The viewer's action is indicated schematically by the arrow pointing generally from the computer 90 to the server computer 62, 62'. In one embodiment the viewer activates a link by clicking a button, and the server computer 62, 62' responds by sending a streaming video segment that the viewer observe. The streaming video segment can in one embodiment be delivered as part of a video greeting card 81. In an alternative embodiment, the video can be delivered as a streaming video directly to the viewer from the host computer 60, without the viewer having to activate the host computer 60.

Figure 3:
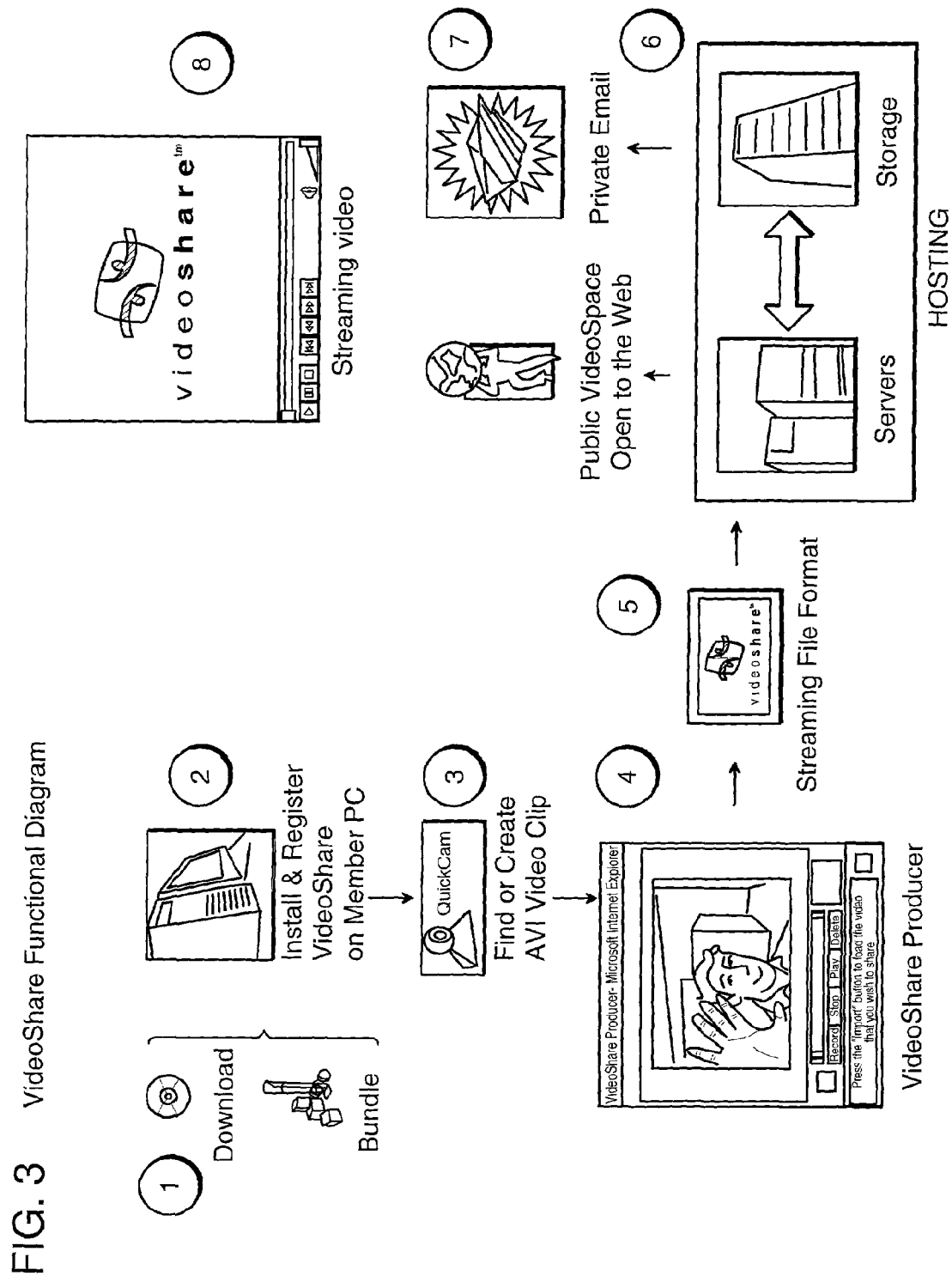
FIG. 3 is a functional block and flow diagram of an embodiment of the invention.

As shown in FIG. 3, the user can obtain a copy of the VideoShare Producer 20 software by downloading a copy of the software from the Website www.VideoShare.com 50, as indicated by the picture at numeral 1. Alternatively, the user can obtain a copy of the VideoShare Producer 20 software on machine readable media such as a CD-ROM or the like. The VideoShare Producer 20 software can be bundled with one or more utility or application programs that are useful for a user to have, such as a "container" application so that the VideoShare Producer 20 software can be operated on a desktop computer. The user can install the VideoShare Producer 20 software on his or her computer 16 and can register with the VideoShare.com hosting service at no charge. In registering for the VideoShare service, the user obtains a username and a password that can be used to identify the user. The activity of installing the VideoShare Producer 20 software on the user's personal computer or the like and registering with the VideoShare system is indicated by the picture at the numeral 2.

In order to use the system, the user first obtains a video segment. The user can create the video segment, for example with a Web cam 12, or the user can use an existing video segment obtained from a video recorder 16, as indicated by the picture at the numeral 3. The VideoShare Producer 20 software has direct capture capabilities that permit the user to create the video segment.

The user can employ the VideoShare Producer 20 software to optionally compress the video; to determine if a video segment is in a format that is compatible with streaming video; to convert the video to a file format that is compatible with streaming video if the video segment is not already in a file format that is compatible with streaming video; and to transmit the video segment together with one or more identifiers that represent selections that the user can make (for example, a still image selected from the series of images that comprise the video segment, an identifier of the sender of the video segment (e.g., the user), an access privilege associated with the video segment, information indicative of a time period during which the video segment will be accessible, and information indicative of a number of instances that the video segment may be accessed). The activities carried out in conjunction with the VideoShare Producer 20 software are generally indicated by the graphic at numeral 4.

The video segment and the identifier(s) are transmitted to the host computer 60 for storage and for later distribution. In one embodiment, the video segment is transmitted in a streaming video file format. This transmission activity is denoted by the graphic at numeral 5.

The video segment is stored under the control of the host computer 60, which can include one or more server computers 62 and storage array 64. The activity of receiving the video segment at the host computer 60 and storing the video segment and its identifier(s) is denoted by the pictures at numeral 6.

Depending on the choice of the user as to access privileges, the video segment can be stored as a publicly available video in a location in storage array 64 that has no restrictions on access, or it can be stored in a portion of storage array 64 that requires some form of authorization to enable access, such as in a private email account area. The storage of the video segment as a public or private video segment is denoted by the pictures at numeral 7.

Upon request from a viewer who has the proper authorization, or upon any request in the case of a video segment available publicly, the host computer 60 sends the video in streaming video format to a viewer, who can observe the video in real time using a conventional web browser without additional plug-in modules. The activity of serving the video segment as a streaming video is denoted by the graphic at numeral 8.

The majority of the VideoShare Producer 20 software was developed as a Windows 95, Windows 98, and Windows 2000 ("Windows 9x/2000") compatible ActiveX control (e.g. an .OCX file), with additional components existing as active template library (ATL) component object model (COM) components that are instantiated during runtime. A "container application," named "VideoProducer.exe," allows the VideoShare Producer ActiveX Control to be executed from the Windows 9x/2000 desktop. The VideoShare Producer Active X Control can also be embedded into a web page, as is done within the www.VideoShare.com 50 web site.

The custom written VideoShare Producer 20 software includes the following binary/source code components: (1) VideoShare Producer ActiveX Control (VideoProducer.ocx); (2) JPEG ATL COM component jpeg.dll); (3) Thumbnail Acquisition DirectShow (ThumbnailFilter.ax); (4) Extended MAPI interface (MapiExAPI.dll); (5) ICQ interface (icqglue.dll); AND (6) VideoShare Upload/Database Server (vpserver.exe).

All components, except for significant portions of the JPEG component that uses public domain source code, were entirely written by VideoShare Inc. The VideoShare Upload/Data Server constantly runs at the VideoShare Hosting Facility, an embodiment of the host computer 60, with which an installed instance of the VideoShare Producer 20 software on a user's computer 16 can be in constant communication. The VideoShare Producer 20 software client/server structure allows the user to upload videos to his or her account through the "Save and Share" button that is described later.

The VideoShare Producer 20 software is built upon the following third-party technologies that provide lower-level device support, document sharing, and file format conversion: (1) Microsoft's DirectShow; (2) Microsoft's Windows Media Technologies; (3) Microsoft's Video for Windows; (4) MAPI; AND (5) ICQ.

Figure 4:
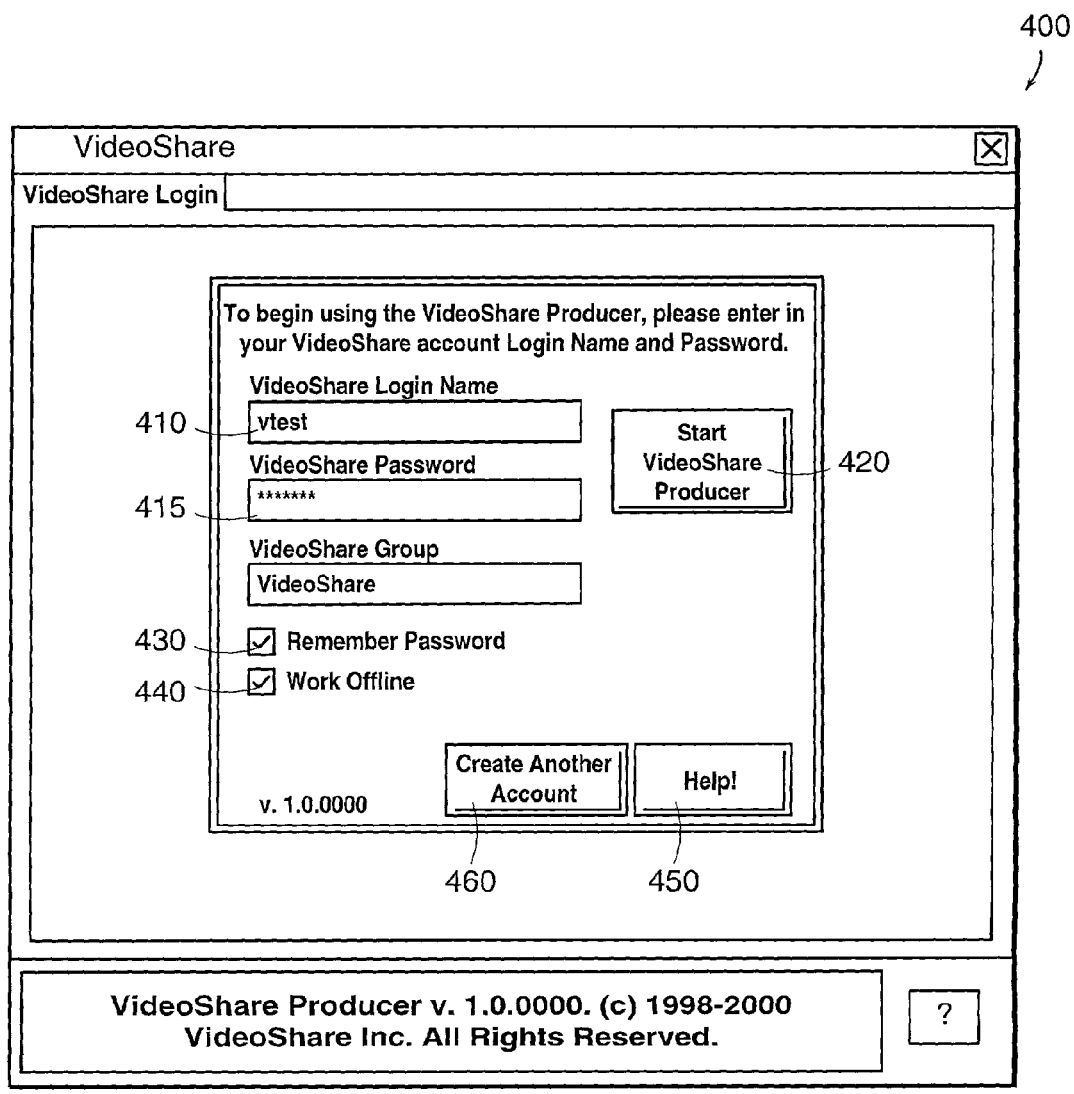
FIG. 4 is a login screen on a user's computer, in one embodiment of the invention.

When the user launches the VideoShare Producer 20 software, he or she will see the window depicted in FIG. 4 appear on his or her computer 16 operating the Win9x/2000 operating system. The login screen can be made optional for repeat users by providing a unique identifier for the user, such as a password, or by installing on the user's computer or the like a record similar to the "cookies" used by some interactive computer systems operating on a network such as the Internet.

When the user enters in his or her username in the box 410 labeled VideoShare Login Name and his or her password in the box 415 labeled VideoShare Password and activates the "Start VideoShare Producer" button 420, the VideoShare Producer 20 software opens a TCP/IP socket connection to the VideoShare Upload/Database Server using port 80 in order to avoid typical Firewall and/or Proxy Server problems. If the box 430 labeled Remember password is checked, the VideoShare Producer 20 software will remember the user's password, eliminating the necessity to type in that information each time the software is started. The VideoShare Upload/Database Server then verifies the validity of the username/password. Furthermore, the VideoShare Producer 20 software will notify the user if there is a more recent version of the software available, giving him or her the opportunity to automatically download and install the new software.

Also at this point, the user can choose to work offline by checking box 440 "Work offline", which suspends communications to the VideoShare Upload/Database Server until the user has filled his or her "Sharing Queue" as described later. The ability to work offline is principally of use for people with computers that do not have a continuously open Internet connection, e.g. computers that use telephone modems rather than high speed connections or equipment such as cellular telephones or hand held devices that require the user to dial in to establish a connection. With this login dialog, the user can also receive help, by activating the "Help" button 450, taking the user to a web page on the VideoShare web site. The login dialog box can also be used to create a new VideoShare user account, by clicking the "Create Another Account" button 460.

Once the login process has been completed, the VideoShare Producer 20 software looks for available DirectShow audio and video capture devices. These available devices are enumerated and listed within the "Settings Tab" as described later. The VideoShare Producer 20 software initializes the audio and video capture device, by recalling as a default the device that was used most recently.

VideoShare Producer Preview/Capture/Import Process

Figure 5:
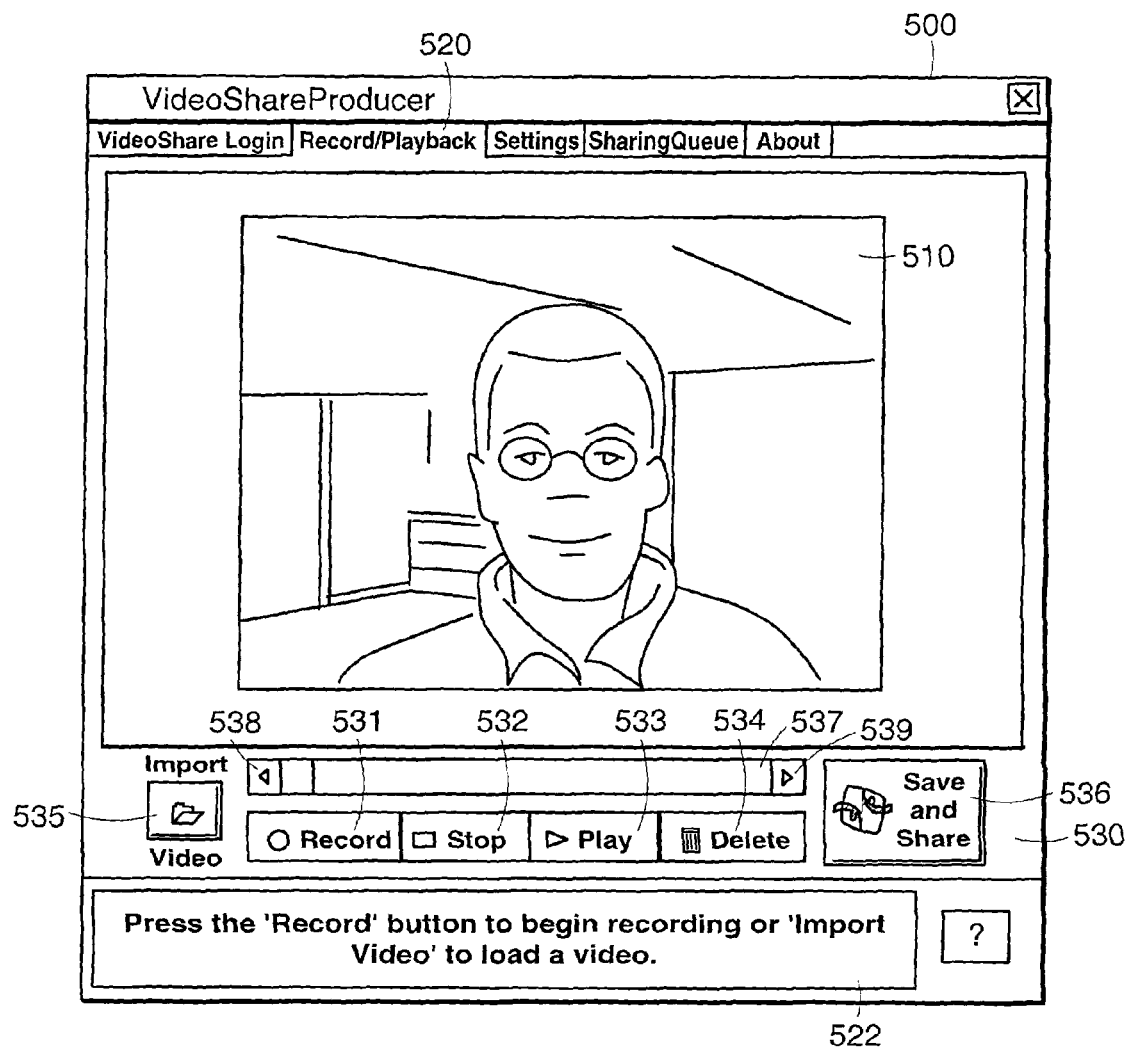
FIG. 5 is a record/playback screen as seen by the user, in accordance with an embodiment of the invention.

After the capture device initialization, the VideoShare Producer 20 software displays the window depicted in FIG. 5.

The image 510 in the middle of the window is the video input stream from the initialized, default video capture source. The image in FIG. 5 is that of an employee of the assignee of the present invention, in the offices of the assignee. The VideoShare Producer 20 software automatically builds a DirectShow "preview graph" where the video stream from the video device is displayed on the screen, but is not saved to disk. This gives the user the opportunity to adjust the camera, e.g. an opportunity to correct the camera position, the camera focus, the camera angle, the magnification of the image, and the like.

At the top of this window, the user is presented with five different "tabs", each presenting the user with different aspects of the VideoShare Producer 20 software. In FIG. 5, the tab labeled "Record/Playback" 520 is active, indicating that the VideoShare Producer 20 software is ready to acquire and/or display a video segment.

At the bottom of the window, there is a status message 522 that displays the current operation of the VideoShare Producer 20 software. In FIG. 5, the status message 522 prompts the user to either activate the Record button 531 to create a new video segment, or to import an existing video segment by activating the Import Video button 535, both of which are described in more detail below.

Directly below the video preview image 510 is a Capture/Playback Control Panel 530 that includes the following items:

Record button 531 which begins a new audio/video capture;

Stop button 532 which terminates an active audio/video capture operation;

Play button 533 which initiates the playing back of the last recorded or imported video;

Delete button 534 which cancels the last record or import operation and begins a new video preview;

Import Video button 535 which allows the user to select a pre-existing video file from his or her hard drive;

Save and Share button 536, which in the present embodiment activates software modules that convert the current video file into a compressed streaming format, upload that converted file to the VideoShare web site, and give the user options to distribute that video to other people; and Shuttle Bar 537 which is used to control the current position of the playback file together with forward button 537 and reverse button 538, allowing the user to rewind and fast forward through the current video.

The software modules that operate upon the activation of Save and Share button 536 will be covered in a subsequent section in this document in detail.

When the user begins to record a video, the VideoShare Producer 20 software builds a new "Capture Graph" that renders the video stream to both the display window as well as to a temporary AVI file on the user's hard drive. The audio/video capturing continues until the user activates the "Stop" button 532 at which point the VideoShare Producer 20 software stops the "Capture Graph", destroys the DirectShow filter, builds a Direct Show "Playback Graph", and displays the first frame of the captured video as video preview image 510. When the user activates the Play button 533 the DirectShow "Playback Graph" is put into running mode, playing back the entire recorded video from beginning to end.

The user can also choose to import a pre-existing video, which in one embodiment can be a file format selected from the AVI, MPEG, or QuickTime file formats, by activating the Import Video button 535. The VideoShare Producer 20 software automatically renders the correct DirectShow filter to display an imported video correctly.

Save and Share Process

Figure 6A:
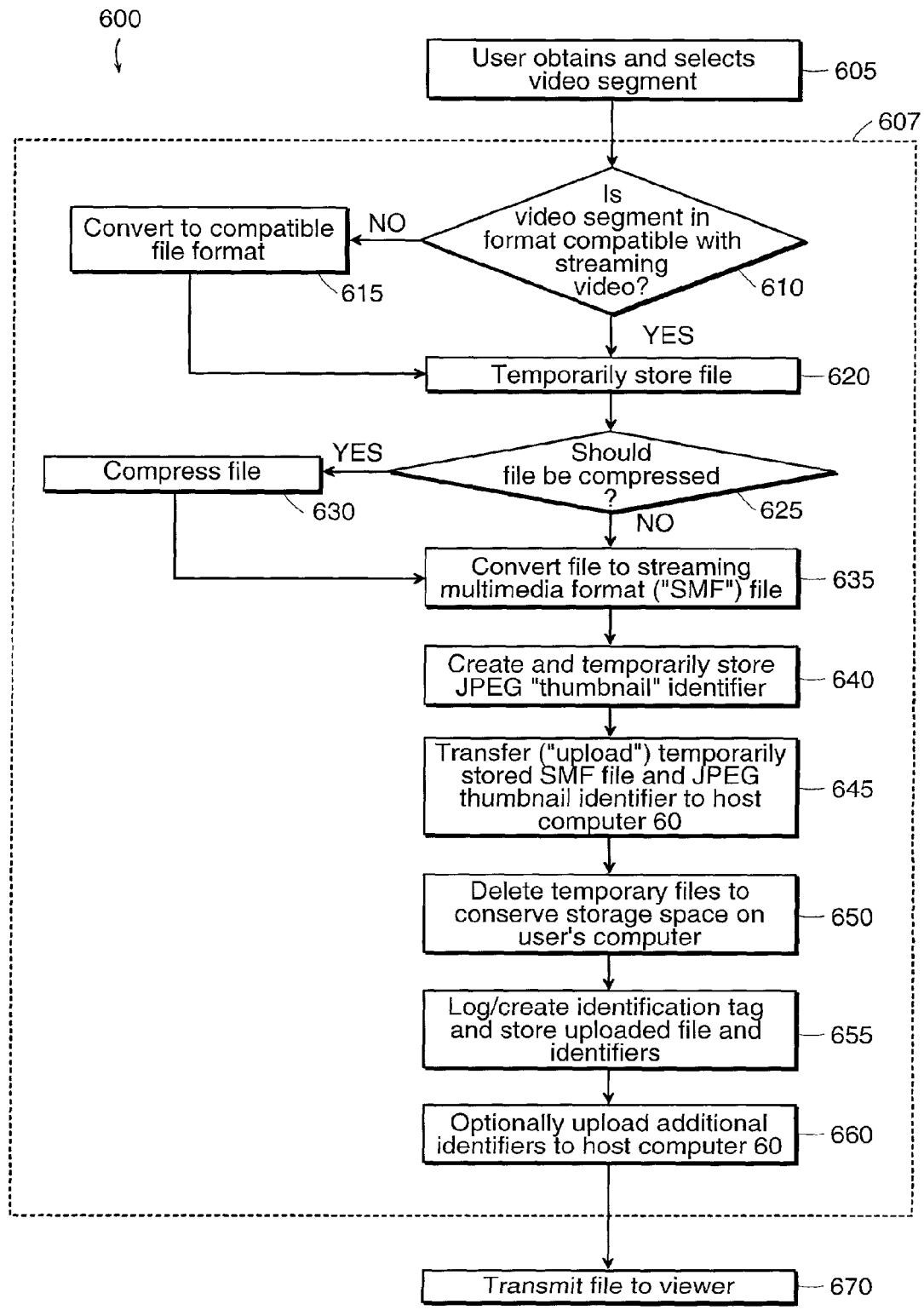
FIG. 6A is a flow diagram of an embodiment of the invention in which software automates a number of steps in connection with the uploading of a video segment.

Once a video segment has been recorded or imported into the user's computer 16 that is running the VideoShare Producer 20 software, the user can choose to process the video segment with various optional alternatives by activating the Save and Share button 536. When the Save and Share button 536 is activated, the video segment is archived and distributed automatically. The VideoShare Producer 20 software greatly simplifies the entire process by seamlessly automating the following steps that are depicted in FIG. 6A:

Video file format conversion, as required;

Compression to a streaming multimedia format at a user-specified bitrate;

Creating a "Thumbnail" JPEG snapshot of the video file, as an identifier that a user or a viewer can observe in order to assess the content of the video segment;

Transferring the resultant video and thumbnail files to the VideoShare server computers 62, 62';

Logging the transactions and managing the user's storage account, including causing the generation of an identification tag that the server computers 62, 62' can employ to retrieve the video segment for viewing; and Automating several possible methods of distributing the video to third party recipients, e.g., viewers.

FIG. 6A shows a flow diagram 600 of an embodiment of the invention in which the VideoShare Producer 20 software automates a number of steps in connection with uploading a video segment by activation of the Save and Share button 536 described in FIG. 5. As indicated at box 605, a user first obtains and selects a video segment for processing for distribution. The box 605 schematically encapsulates all of the actions that a user takes as described in relation to FIGS. 4 and 5 above. When the user activates the Save and Share button 536 the actions described below that are enclosed by the dotted line 607 are automatically carried out under the control of the VideoShare Producer 20 software.

The VideoShare Producer 20 software subjects the selected video segment to analysis to determine whether the selected video segment is or is not in a file format that is compatible with a streaming video format, as indicated at diamond 610. Formats that are compatible with streaming media formats include formats such as MPEGs and QuickTime videos. If the selected video segment is not compatible with a streaming video format, it is converted to a compatible format, as depicted by the arrow labeled "NO" that points from the diamond 610 to the box 615, "Convert to compatible file format." The conversion process performed by the VideoShare Producer 20 software creates a DirectShow filter graph that decompresses the video file into a temporary, uncompressed AVI file.

The video segment file in a format that is compatible with streaming video is then temporarily stored in the user's computer 16, for example as a file on the hard drive of computer 16. This storing step is performed if the file was originally in a format compatible with streaming video by following the arrow marked "YES" that points from the diamond 610 to the box 620, "Temporarily store file." Alternatively, the storing step is performed if the file was originally not in a format compatible with streaming video by following the arrow that points from the box 615 to the box 620.

The stored temporary file representing the selected video is then analyzed by the VideoShare Producer 20 software, as represented by diamond 625, "Should file be compressed?" to determine if the temporarily stored file should be compressed. If the software determines that the file should be compressed, as indicated by the arrow labeled "YES" that points from the diamond 625 to the box 630, labeled "Compress file," the file is compressed. The compression involves compressing the video file to a user-specified bitrate, or the bandwidth that is required to view the video without disruption in the transmission. The user can select the desired bitrate by using the "Settings Tab" that is described in more detail below.

The file is then converted to a streaming multimedia format file as indicated by the box 635, labeled "Convert file to streaming multimedia format ("SMF") file," as denoted by the arrow pointing from the box 630 to the box 635. If the file is not to be compressed, the flow follows the arrow labeled "NO" pointing from the diamond 625 to the box 635, and the file is then converted to a streaming multimedia format file as schematically represented by the box 635.

The process that is performed by the VideoShare Producer 20 software as denoted by the box 635 involves reading in the video file, frame by frame, and converting the video into a streaming multimedia format. In one embodiment, the VideoShare Producer 20 software uses the Windows Media Streaming Format, known as ASF or WMF, but it is not technologically restricted to this choice. The Windows Media Streaming Format comprises MPEG 4 v3 for the video stream and the Windows Media Audio format for the audio stream. The output of this file is stored as a temporary file on the user's hard drive, in one embodiment.

The flow diagram indicates that the process makes a "thumbnail" of the video file, as represented schematically by the box 640, labeled "Create and temporarily store JPEG "thumbnail" identifier." The VideoShare Producer 20 software produces a JPEG still image that is used as a reference image to the entire video file. It is an identifier of the subject matter or content of the video that a user or a viewer can readily recognize, as compared to an alphanumeric string such as a typical string used to identify a file by its drive, directory (and one or more subdirectories) and filename. Such alphanumeric identifiers are useful, but may be totally uninformative as to the content or subject matter contained in the identified file or video segment. In one embodiment, the VideoShare Producer 20 software creates the "thumbnail" by taking the "middle" image of the entire video file, as measured by the temporal duration of the file. In another embodiment, the selection of an image from which to make the "thumbnail" can be left to the discretion of the user. This JPEG file is also stored as a temporary file on the user's hard drive, in one embodiment.

The next part of the process is the upload operation, in which the VideoShare Producer 20 software contacts the host computer 60, which in one embodiment is the VideoShare Upload/Database Server at the VideoShare hosting facility. This portion of the automated process is denoted by the box 645 labeled "Transfer ("upload") temporarily stored SMF file and JPEG thumbnail identifier to host computer 60." The VideoShare Producer 20 software notifies the host computer 60 that the user wishes to place his or her video into a repository maintained by the host computer 60, which in one embodiment can be the VideoShare VideoCenter, which is a repository of all recorded and uploaded videos to date. This upload is performed automatically using a direct TCP/IP socket connection over a specific connection port of the user's computer known as port 80. The VideoShare Producer 20 software uses a standard communications protocol to perform this transfer to the host computer 60. In another embodiment, a proprietary protocol can be used, for example if one wants to maintain the security of information contained in the video segment. In another embodiment, the video segment can be encrypted in order to provide enhanced security. Both the compressed video streaming multimedia file and the thumbnail image are uploaded at substantially the same time.

As schematically depicted by box 650, labeled "Delete temporary file to conserve storage space on user's computer," the VideoShare Producer 20 software removes all of the temporary files that were created in the course of the automated processing described above. This feature provides for the user a convenient, secure, and transparent process, with the benefit that the user's computer storage device(s), for example one or more hard drives, do not become cluttered with unnecessary and obsolete files.

Once the upload has been completed, the VideoShare Producer 20 software and the host computer 60 (for example, the VideoShare Upload/Database Server) will update the user's account to account for the required storage space that the video requires. The necessary logging, creation of an identification tag, and storing of the video and the associated identifier or identifiers is also performed automatically, as schematically depicted by box 655.

The user can optionally add additional identification and control information about the user, and about how and under what conditions the video is to be made available for distribution, as schematically indicated by box 660. The process by which some of this information is collected is discussed below with regard to FIG. 8. The user is automatically prompted to provide this information, but has the option to forego making a decision immediately. The transmission of video segment files to viewers is discussed in more detail below, and is represented in FIG. 6 by the box 670 labeled "Transmit file to viewer" which is outside the region 607 as an indication that the transmission of files to viewers is an action beyond the material discussed above in conjunction with the Save and Share button 536 of FIG. 5.

Figure 6B:
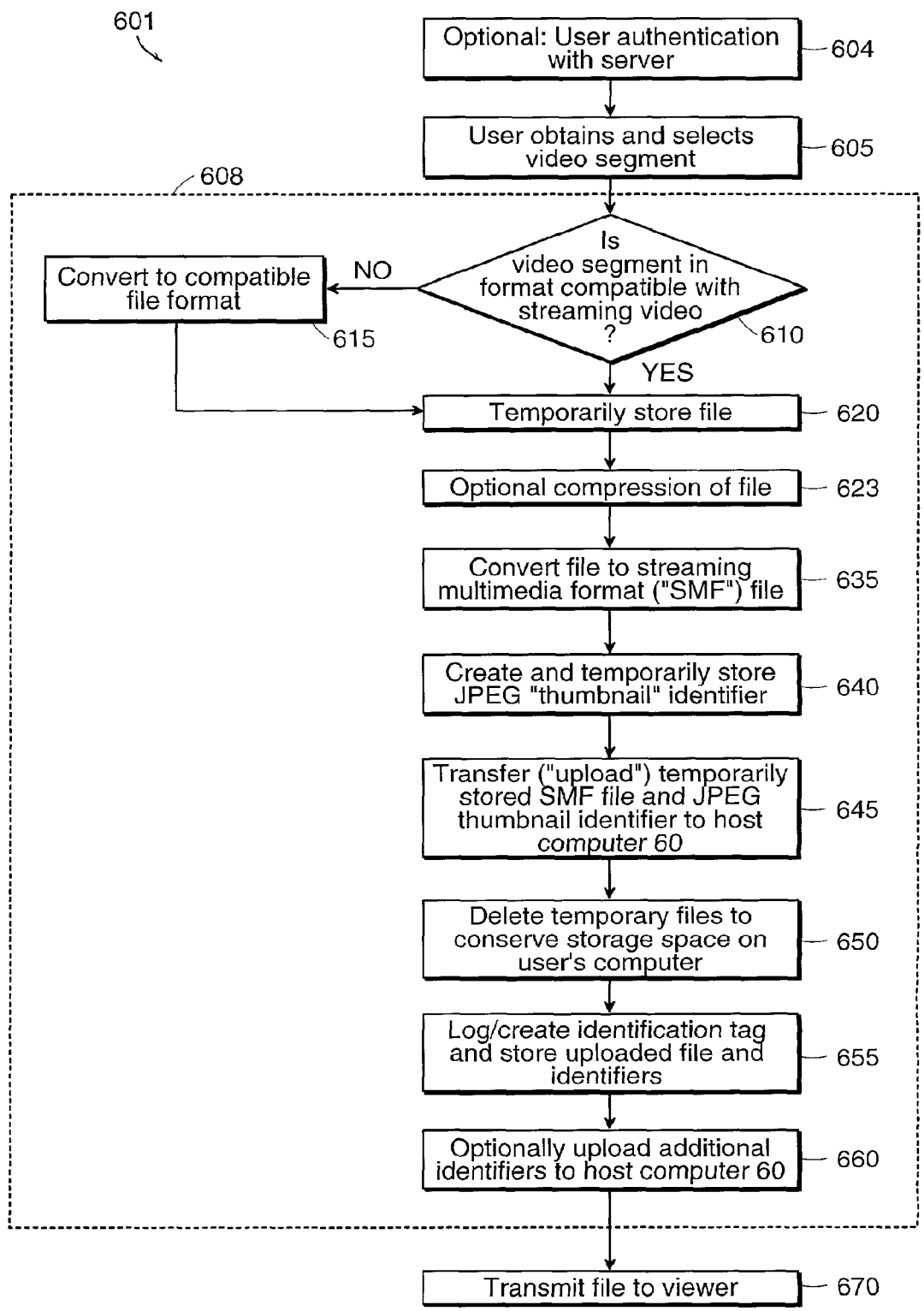
FIG. 6B is a flow diagram of another embodiment of the invention in which software automates a number of steps in connection with the uploading of a video segment.

FIG. 6B shows a flow diagram 601 of another embodiment of the invention in which software automates a number of steps in connection with uploading a video segment. Many of the steps already described in connection with FIG. 6A also occur in the embodiment depicted in FIG. 6B, and are numbered in the same manner as in FIG. 6A. In FIG. 6B, there is first an optional step indicated by the box 604 labeled "Optional: User authentication with server" in which the User is optionally required to provide identification, such as a user name and password, that authenticates the identity of the user to the server or host computer 60. The user then obtains and selects a video segment for processing for distribution, as indicated at box 605 that schematically encapsulates all of the actions that a user takes as described in relation to FIGS. 4 and 5 above. When the user activates the Save and Share button 536 the actions described below that are enclosed by the dotted line 608 are automatically carried out under the control of the VideoShare Producer 20 software.

As discussed in relation to FIG. 6A, the VideoShare Producer 20 software subjects the selected video segment to analysis to determine whether the selected video segment is or is not in a file format that is compatible with a streaming video format, as indicated at diamond 610. If the selected video segment is not compatible with a streaming video format, it is converted to a compatible format, as depicted by the arrow labeled "NO" that points from the diamond 610 to the box 615, "Convert to compatible file format." The conversion process performed by the VideoShare Producer 20 software creates a DirectShow filter graph that decompresses the video file into a temporary, uncompressed AVI file.

The video segment file in a format that is compatible with streaming video is then temporarily stored in the user's computer 16, for example as a file on the hard drive of computer 16. This storing step is performed if the file was originally in a format compatible with streaming video by following the arrow marked "YES" that points from the diamond 610 to the box 620, "Temporarily store file." Alternatively, the storing step is performed if the file was originally not in a format compatible with streaming video by following the arrow that points from the box 615 to the box 620.

The stored temporary file representing the selected video is then analyzed by the VideoShare Producer 20 software, and optionally compressed as represented by the box 623 labeled "Optional compression of file." The file is then converted to a streaming multimedia format file as indicated by the box 635, labeled Convert file to streaming multimedia format ("SMF") file. Alternatively, a file from the box 620 can be uploaded to the host computer 60 without being converted to a streaming format, and the conversion to a streaming video format can be accomplished at the host computer 60. The process that is performed by the VideoShare Producer 20 software as denoted by the box 635 involves reading in the video file, frame by frame, and converting the video into a streaming multimedia format.

The flow diagram indicates that the process makes a "thumbnail" of the video file, as represented schematically by the box 640, labeled Create and temporarily store JPEG "thumbnail" identifier.

The next part of the process is the upload operation, in which the VideoShare Producer 20 software contacts the host computer 60, which in one embodiment is the VideoShare Upload/Database Server at the VideoShare hosting facility. This portion of the automated process is denoted by the box 645 labeled "Transfer ("upload") temporarily stored SMF file and JPEG thumbnail identifier to host computer 60." Both the compressed video streaming multimedia file and the thumbnail image are uploaded at substantially the same time.

As schematically depicted by box 650, labeled Delete temporary file to conserve storage space on user's computer, the VideoShare Producer 20 software removes all of the temporary files that were created in the course of the automated processing described above. This feature provides for the user a convenient, secure, and transparent process, with the benefit that the user's computer storage device(s), for example one or more hard drives, do not become cluttered with unnecessary and obsolete files.

Once the upload has been completed, the VideoShare Producer 20 software and the host computer 60 (for example, the VideoShare Upload/Database Server) will update the user's account to account for the required storage space that the video requires. The necessary logging, creation of an identification tag, and storing of the video and the associated identifier or identifiers is also performed automatically, as schematically depicted by box 655.

The user can optionally add additional identification and control information about the user, and about how and under what conditions the video is to be made available for distribution, as schematically indicated by box 660. The process by which some of this information is collected is discussed below with regard to FIG. 8. The user is automatically prompted to provide this information, but has the option to forego making a decision immediately. The transmission of video segment files to viewers is discussed in more detail below, and is represented in FIG. 6B by the box 670 labeled "Transmit file to viewer" which is outside the region 608 as an indication that the transmission of files to viewers is an action beyond the material discussed above in conjunction with the Save and Share button 536 of FIG. 5.

Figure 6C:
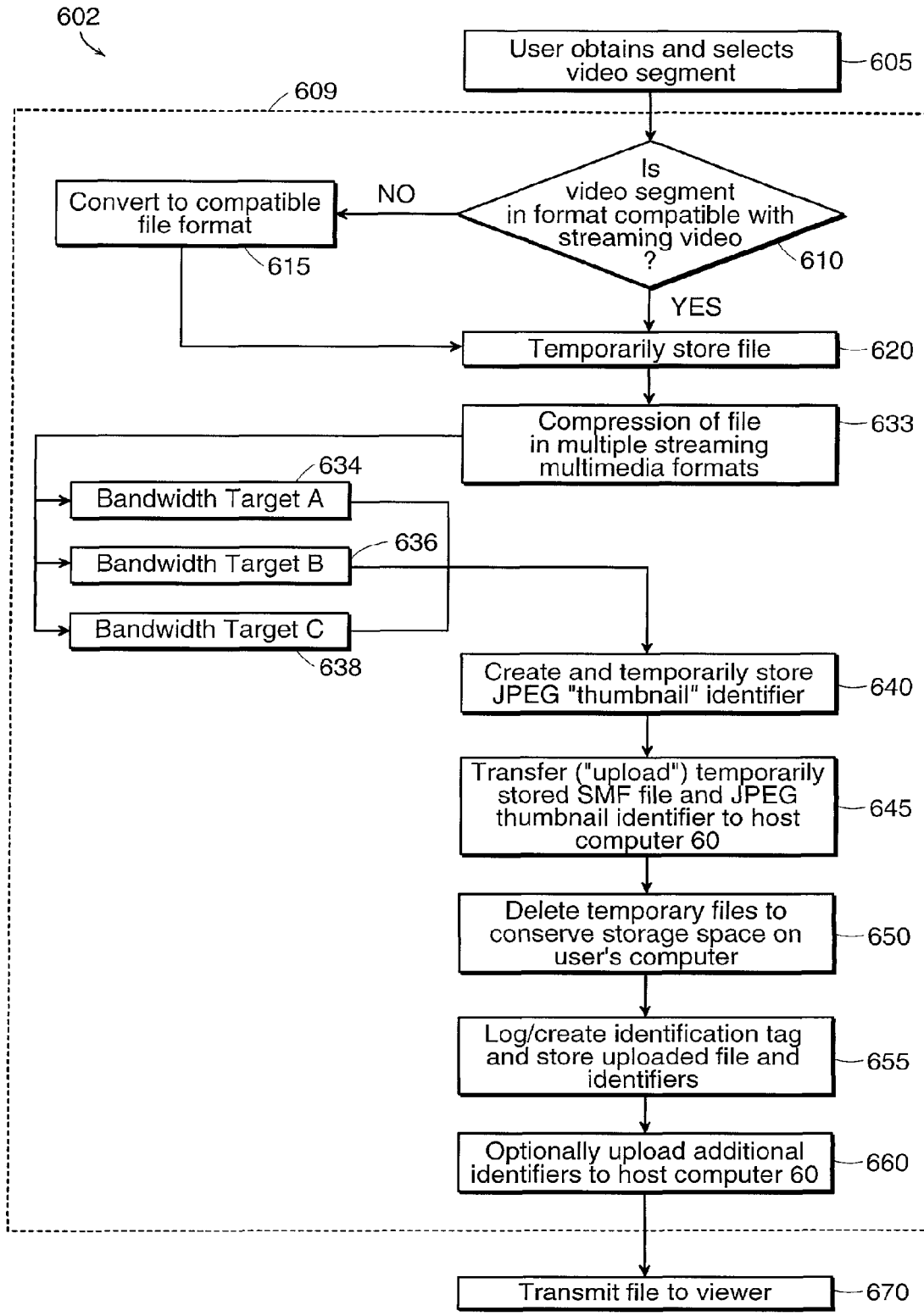
FIG. 6C is a flow diagram of an embodiment of the invention in which software automates a number of steps in connection with the formatting of a video segment.

FIG. 6C shows a flow diagram 602 of an embodiment of the invention in which software automates a number of steps in the formatting of a video segment. In particular, in this embodiment, the video segment that the user wishes to provide in streaming video format is compressed into a plurality of formats, each of which is encoded for optimal display at a different transmission bitrate. There can be a benefit to recording the same video segment in multiple formats. For example, a casual viewer may have only a slow speed modem, such as a 28.8 kilobaud (kB) modem. For such a viewer, the slow transmission speed can make the size of a file a critical feature. Such a user can view a video in real time if it is formatted for a 28.8 kB modem, but not if it is formatted for appreciably higher transmission speeds. Another user, for example, one who has a T1 connection that can handle transmission speeds up to approximately 1.5 megabaud, could successfully receive a version of the same video segment that is formatted for higher transmission speeds, with the possibility of having a better quality image and higher resolution, perhaps with better audio as well. The T1 user could see the version of the video segment intended for 28.8 kB transmission if he or she wanted to, but might prefer to see a video segment that appeared to be more professional in quality. By using a system that can automatically discriminate the transmission speed capabilities of the hardware that the user employs, the embodiment allows each user to view a version of the video segment that is optimally configured for the user's hardware.

In particular, the steps of the method enclosed within the dotted rectangle 609 are automated by software that embodies the present invention. As described above, the user obtains and selects a video segment for processing for distribution, as indicated at box 605 that schematically encapsulates all of the actions that a user takes as described in relation to FIGS. 4 and 5 above. When the user activates the Save and Share button 536 the actions described below that are enclosed by the dotted line 609 are automatically carried out under the control of the VideoShare Producer 20 software.

As discussed in relation to FIG. 6A, the VideoShare Producer 20 software subjects the selected video segment to analysis to determine whether the selected video segment is or is not in a file format that is compatible with a streaming video format, as indicated at diamond 610. If the selected video segment is not compatible with a streaming video format, it is converted to a compatible format, as depicted by the arrow labeled "NO" that points from the diamond 610 to the box 615, "Convert to compatible file format." The conversion process performed by the VideoShare Producer 20 software creates a DirectShow filter graph that decompresses the video file into a temporary, uncompressed AVI file.

The video segment file in a format that is compatible with streaming video is then temporarily stored in the user's computer 16, for example as a file on the hard drive of computer 16. This storing step is performed if the file was originally in a format compatible with streaming video by following the arrow marked "YES" that points from the diamond 610 to the box 620, "Temporarily store file." Alternatively, the storing step is performed if the file was originally not in a format compatible with streaming video by following the arrow that points from the box 615 to the box 620.

The temporarily stored file is then compressed in multiple streaming multimedia formats, as denoted by the box 633. In the present example, three files will be used to describe the process, but it should be understood that more or fewer than three formats may be created at substantially the same time. The resulting multiple files are denoted by the three boxes 634, 636 and 638 labeled "Bandwidth Target A," "Bandwidth Target B," and "Bandwidth Target C," respectively. Each file is optimally encoded for play as a streaming video segment at a particular transmission rate and bandwidth, such as 28.8 kB, 56 kB, 100 kB, 300 kB, or other transmission rates.

As described above, the method includes a step of creating and temporarily storing a thumbnail identifier, as denoted by the box 640. Rather than transmitting one video segment in one SMF with one thumbnail, the embodiment of FIG. 6C transmits all the files 634, 636 and 638 in association with the single thumbnail and any other identifiers that are selected as appropriate. For example, each SMF file can be identified as to its bandwidth. In an alternative embodiment, the system transmits only a single SMF file with its associated identifiers, including the JPEG "thumbnail", and the multiple bandwidth variants of the SMF file are generated at the host computer 60. This embodiment may be advantageous when the user has only a slow speed modem, and would be severely time constrained by having to upload multiple files.

The remaining steps of this embodiment, as denoted by the boxes 650, 655, 660 and 670, correspond substantially to the steps in FIG. 6A represented by the boxes identified with the corresponding numerals. It should be noted that the precise order of some of the steps, for example, the step denoted by the box 655 and the step denoted by the box 650, can be interchanged without a different outcome of the overall process. Other such interchanges in sequence are possible as well, again without a different outcome of the overall process.

Figure 6D:
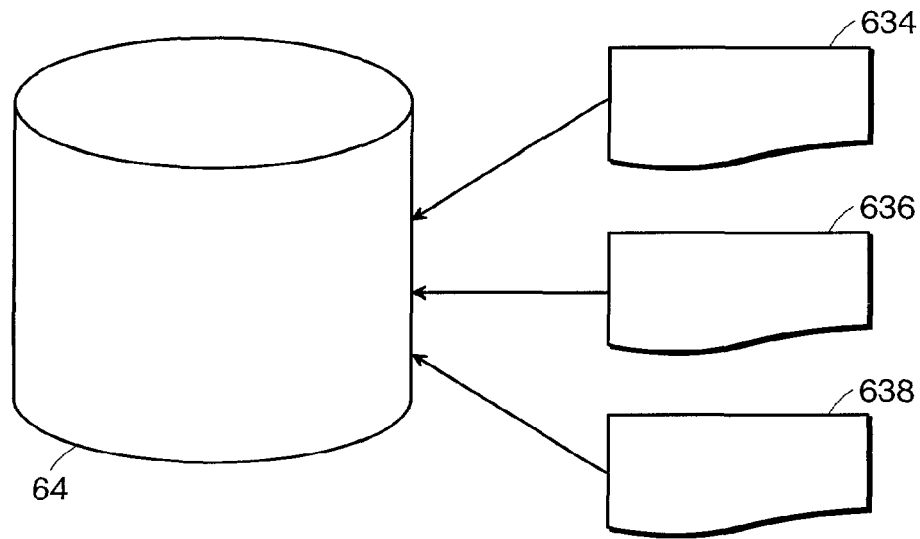
FIG. 6D shows the relationship of some of the files created in the flow diagram of FIG. 6C.

FIG. 6D depicts an embodiment of the database 64 of the host computer 60 on which are recorded the three exemplary bandwidth target files 634, 636 and 638 for FIG. 6C. These files are available for delivery over a computer network to a viewer. The files 634, 636 and 638 represent three versions of the same video segment in streaming multimedia format, each suitable for optimal viewing by a user having hardware operating at the transmission rate corresponding to the format of one of the files.

Figure 6E:
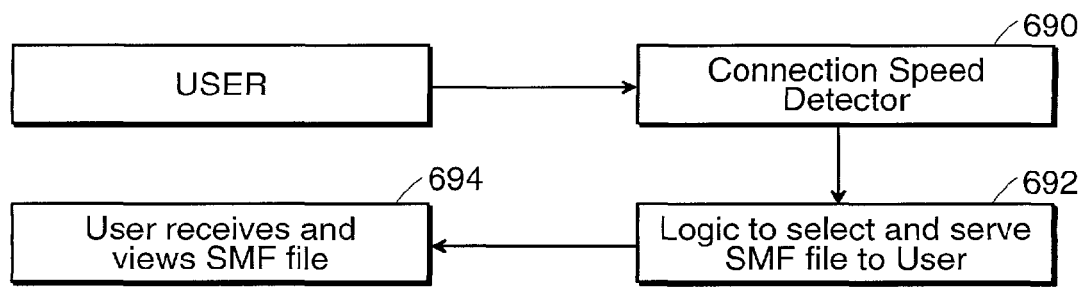
FIG. 6E is a flow diagram of a method by which an optimally formatted video segment is sent to a user according to the invention.

As shown in FIG. 6E, the user (or the viewer) transmits to the host computer 60 a request for a particular video segment, denoted by the arrow from the box labeled "USER" to the box 960 labeled "Connection Speed Detector." Host computer 60 can include hardware that can sense the transmission speed of a user computer 16, or of a computer used by a person desiring to view a video segment. Alternatively, the host computer 60 can inquire of the computer on the network that is connected to the user computer 16 or the computer of a viewer about the speed of connection that is being maintained. When the information is available to the host computer 60, the host computer 60 can determine which file of the files exemplified by 634, 636 and 638 is most appropriate to serve to the user or viewer, as denoted by the box 692 labeled "Logic to select and serve SMF file to User." The host computer 60 then transmits the appropriate file to the user, as denoted by the arrow from the box 692 to the box 694 labeled "User receives and views SMF file." Alternatively, the viewer can request the transmission of a file encoded at a specific bitrate.

Figure 7:
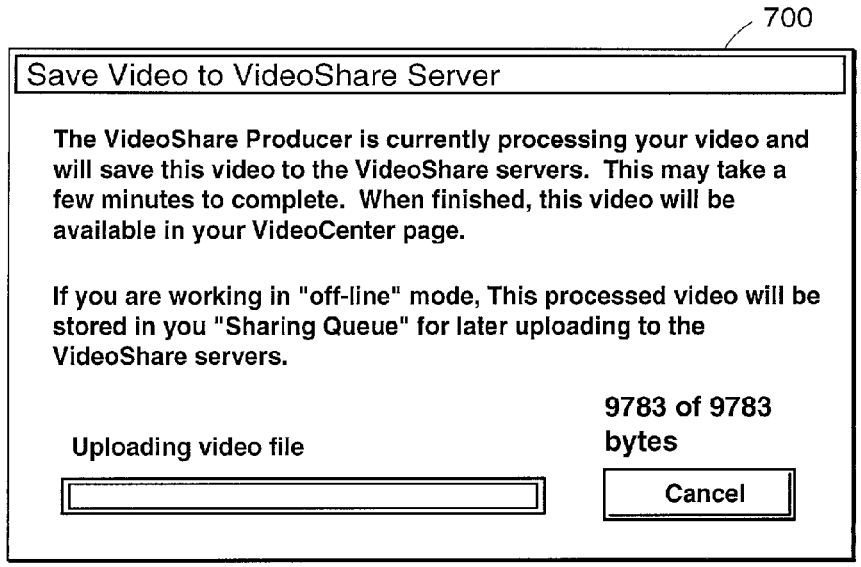
FIG. 7 is a screen as seen by the user, the screen indicating that file processing is occurring.

When the user begins the process described in relation to FIG. 6A, in one embodiment, the "Progress Dialog" screen 700 depicted in FIG. 7 is presented, reflecting the status of the process in real time. The "Progress Dialog" screen 700 notifies the user about the total number of bytes that have to be uploaded to perform the transfer and it also informs the user of the number of bytes and the percentage of the file that have been uploaded in real time.

Figure 8:
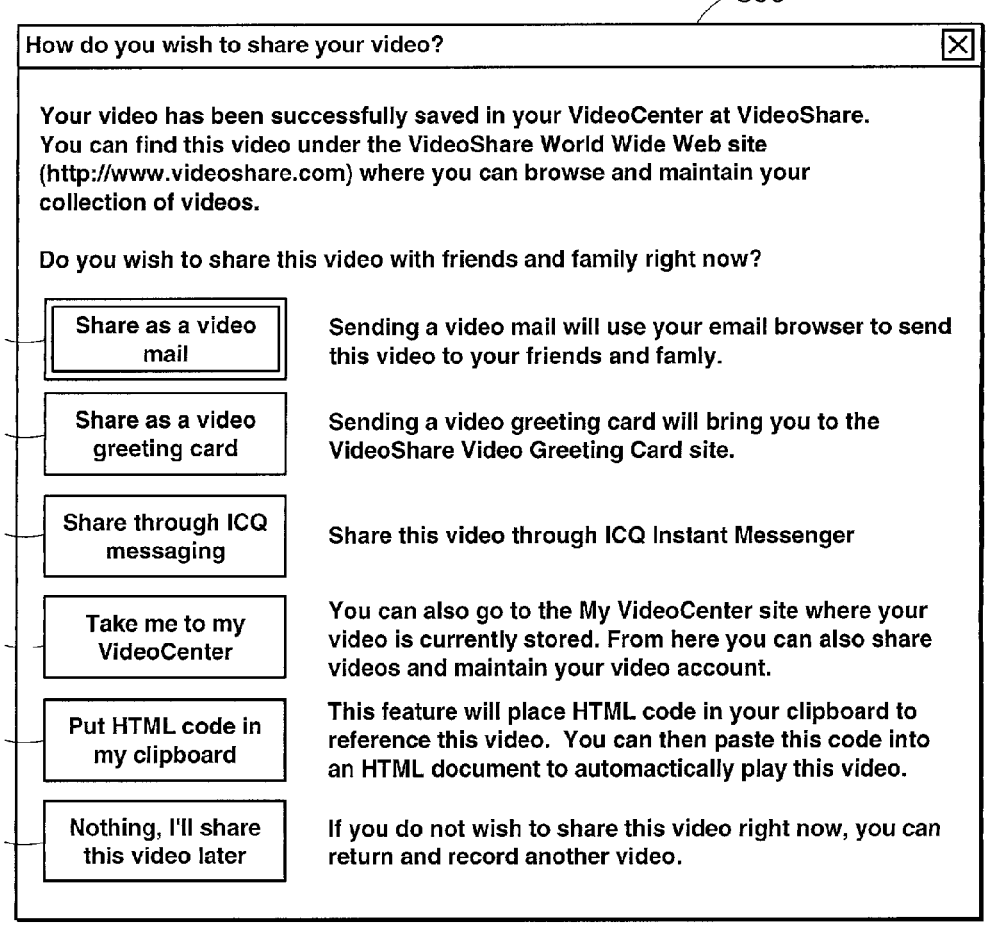
FIG. 8 is an interactive screen used to determine the desires of the individual who sends a video for storage.

FIG. 8 depicts a dialog panel 800 presenting several methods with which the user can distribute the uploaded streaming video segment and its associated identifiers to third party recipients. The dialog panel 800 prompts the user as to the possible selections that the user can elect.

In one embodiment, there are five possible methods to distribute the video file:

The user can elect to use an email browser to send an email to one or more people that includes a URL reference to the video located on the VideoShare web site. This also includes the further possibility to send the video player directly embedded inside the email message. This option is elected by activating the button 810, labeled "Share as a video mail."

The user can elect to share the video as a greeting card, bringing the user to the Video Greeting Card web page at the VideoShare web site. In this case, the user will also select features relating to the greeting card. The user can elect this option by activating the button 820, labeled "Share as a video greeting card."

The user can elect to send an ICQ URL message, automatically interfacing with ICQ's Instant Messenger software. The user can elect this option by activating the button 830 labeled "Share through ICQ Messaging."

The user can elect to go to the user's VideoCenter page on the VideoShare web site, from which location the video can also be shared or sent to others. The user can elect this option by activating the button 840, labeled "Take me to my Video-Center."

The user can elect to place HTML code in the user's clipboard that references the video. This HTML code can be "pasted" into any Web page that supports HTML inserts. The user can elect this option by activating the button 850, labeled "Put HTML code in my clipboard." In one embodiment, this option allows a user to paste a video into a Web page, for example to demonstrate the use of a product for sale, or to present a personal greeting to visitors to the Web page.

By electing to activate the button 860, labeled "Nothing, I'll share this video later," the user can postpone making an election regarding the sharing of the uploaded video segment.

The above options are discussed in more detail below.

Sharing the video by using email will bring up the user's default email browser, such as Outlook, Netscape Communicator, Eudora, etc. This is accomplished through the use of MAPI technologies that allow for document exchange on Win9x/2000 systems. A user who employs Netscape Communicator or Microsoft Outlook will be able to directly embed the Windows Media Player inside the email text body, allowing the recipient to directly play the video from his or her email browser. In one embodiment, this "embedded video mail" feature causes a window such as that depicted in FIG. 9 to appear, for example when the user is using Microsoft Outlook for e-mail service.

Figure 9:
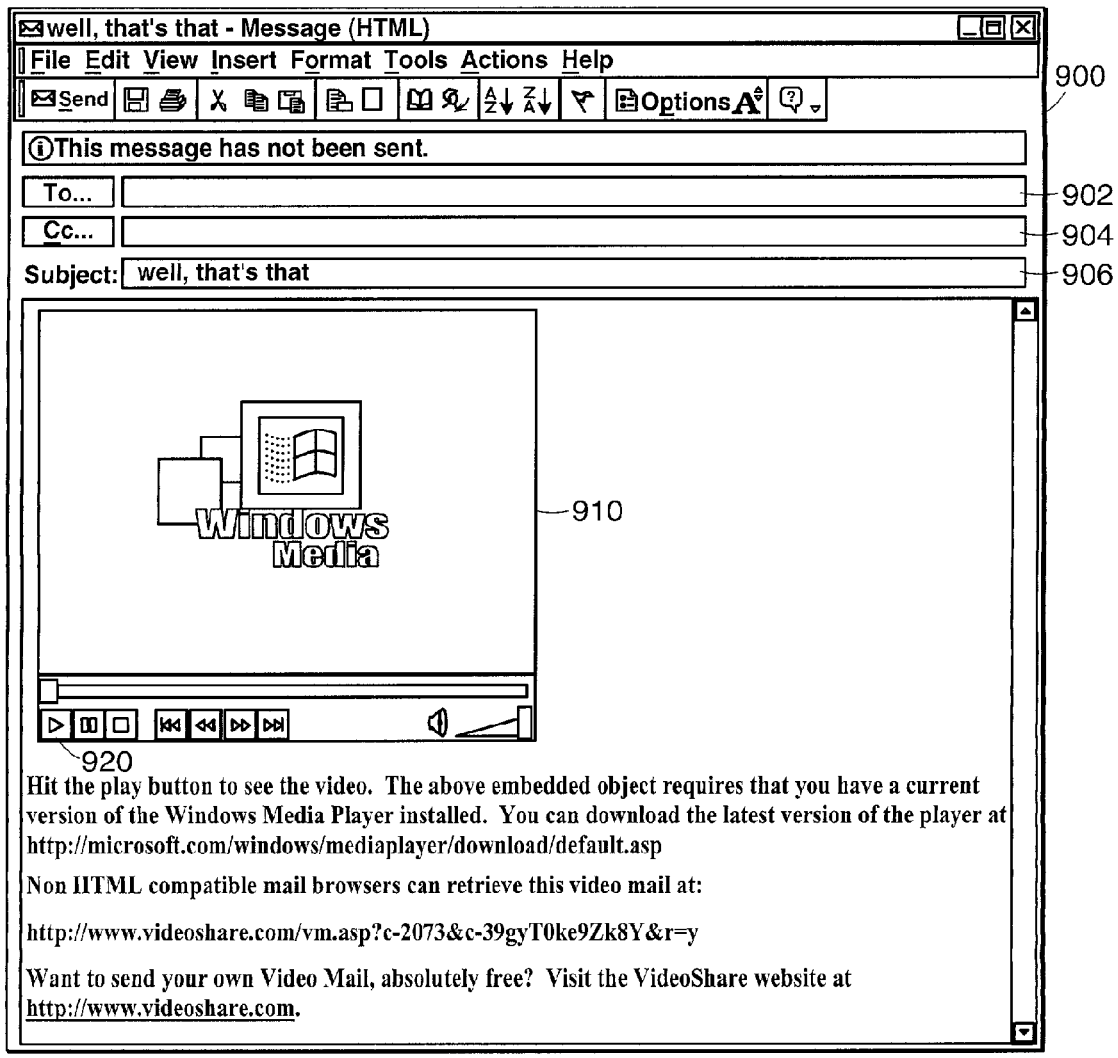
FIG. 9 is a video playback screen seen by the user.

As shown in FIG. 9, at the top of the email message, the VideoShare Producer 20 software will display the Windows Media Player 910 with the sender's recorded video preloaded. The recipient of this embedded video mail only needs to activate the play button 920 on the Windows Media Player to see the video segment, rather than going to a URL hyperlink. The embodiment includes the conventional dialog boxes for entry of an email address for a recipient (box 902), a "carbon copy" ("cc") address (box 904), and a subject (box 906). In the embodiment shown, instructions are presented below the Windows Media Player 910 for the convenience of the recipient.

The two options "Share as a Video Greeting Card" and "Take me to my VideoCenter" causes the VideoShare Producer 20 software to spawn off a Web browser and automatically jump to one of these two pages on the VideoShare Web site. The user can define the features of a video greeting card, and can direct the card as an e-mail to a viewer. Alternatively, the user can define a recipient list for the video segment as a single item to be viewed, and can send the video to the locations on the list.

The "Share Through ICQ Messaging" button 830 can bring up ICQ's Instant Messenger software, if it is installed on the user's machine, and can initiate a "URL Message" construction automatically. The VideoShare Producer 20 software can automatically fill out the URL that references the playback of the user's video. The recipient of this URL Message can view the video by clicking a mouse on the URL to be taken directly to the VideoShare web site, where the video can be displayed.

The "Put HTML code in my clipboard" button 850 can place a section of HTML code that, when the user pastes this code in a web page, causes the Windows Media Player to automatically instantiate a video playback of the message. This feature enables the user to place this video in any system that supports HTML code, such as personal web pages, online auction sites, online job boards, and the like.

Working Offline and the "Sharing Queue"

The VideoShare Producer 20 software also allows the user to "work offline." Offline means that the VideoShare Producer 20 software will not communicate with the host computer 60 (for example, the VideoShare Upload/Database Server) until the user explicitly uploads one-or-more videos by using a "Sharing Queue." This Sharing Queue appears to the user as one of the main tabs in the VideoShare Producer 20 software and acts as a temporary queue for recorded/imported videos. "Work offline" allows the user to not make an Internet connection until he or she is ready to upload more than one video at a time. This mode of operation is useful for modem users who incur considerable expense for extended dial-in times or people who are using laptops and are not always near an Internet connection outlet.

Figure 10:
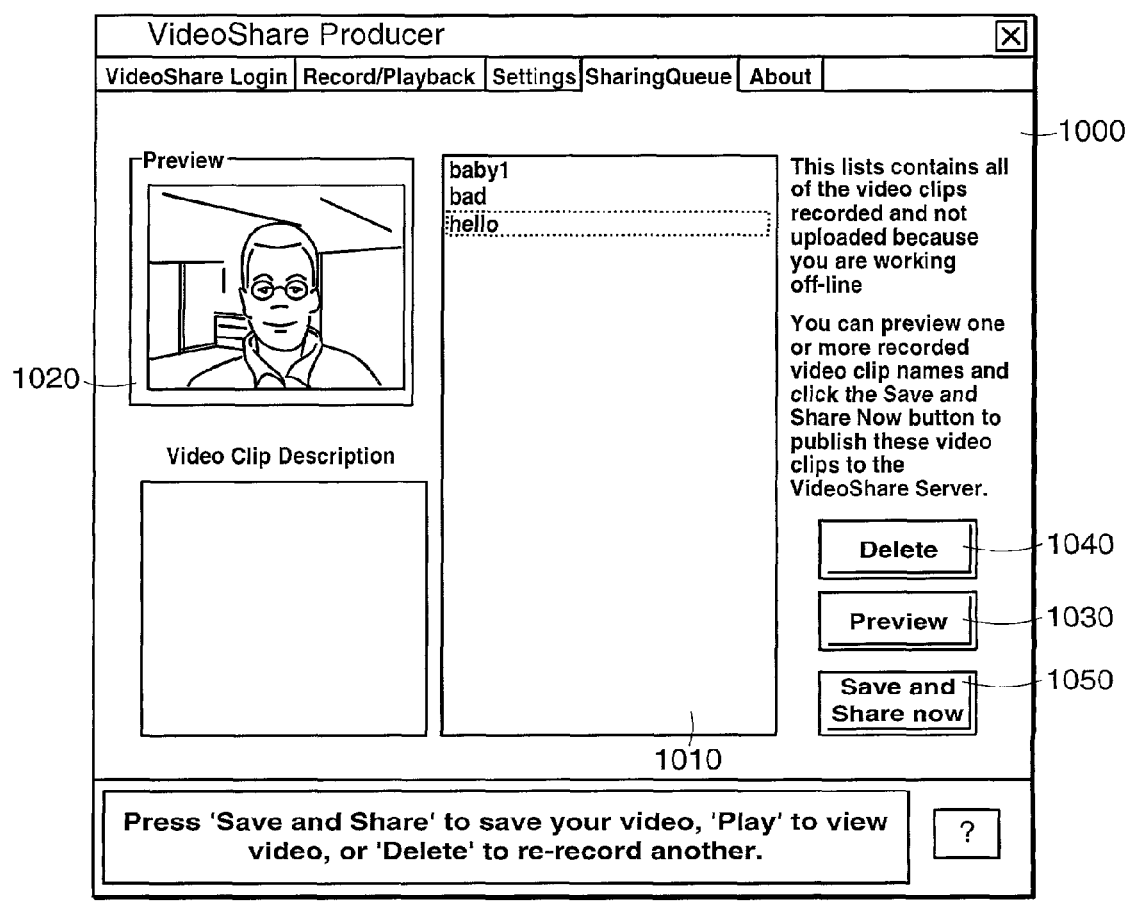
FIG. 10 is a screen used by the user to control the status of a video queue.

FIG. 10 shows a screen 1000 used to control the status of a video queue. When the user, after recording or importing a video, clicks the "Save and Share" button 536 of FIG. 5 while in "offline mode," the VideoShare Producer 20 software performs the first three steps of the "Save and Share Process," namely, the video file format conversion represented by box 615 of FIG. 6A, the compression of the video segment to a streaming multimedia format at a user-specified bitrate represented by the box 635 of FIG. 6A, and the creation of a "Thumbnail" JPEG snapshot of the video file represented by the box 640 of FIG. 6A. The resulting output files are stored in a local database for later use in the "Sharing Queue," which is an operation similar to the temporary storage of files depicted in FIG. 6A. In the middle of FIG. 10 is a dialog box 1010 that displays a list of video segments that are ready to be uploaded to the VideoShare Web site. The small "Preview" window 1020 in the upper left corner of FIG. 10 is a Direct-Show playback graph that allows the user to review the stored video segment that is highlighted in the dialog box 1010. The user can use this window to preview the video segment file by activating the "Preview" button 1030, to delete the video segment file by activating the "Delete" button 1040, and to upload and publish the video by activating the "Save and Share Now" button 1050.

The "Save and Share Now" button 1050 performs the uploading process on each of the queued videos, creating a TCP/IP connection to the VideoShare Upload/Database Server, transferring the file to the VideoShare web site, and updating the user's VideoShare account, in a manner substantially similar to the method employed by the Save and Share button 536 of FIG. 5 to accomplish the same activities.

Audio/Video Setting Process

Figure 11:
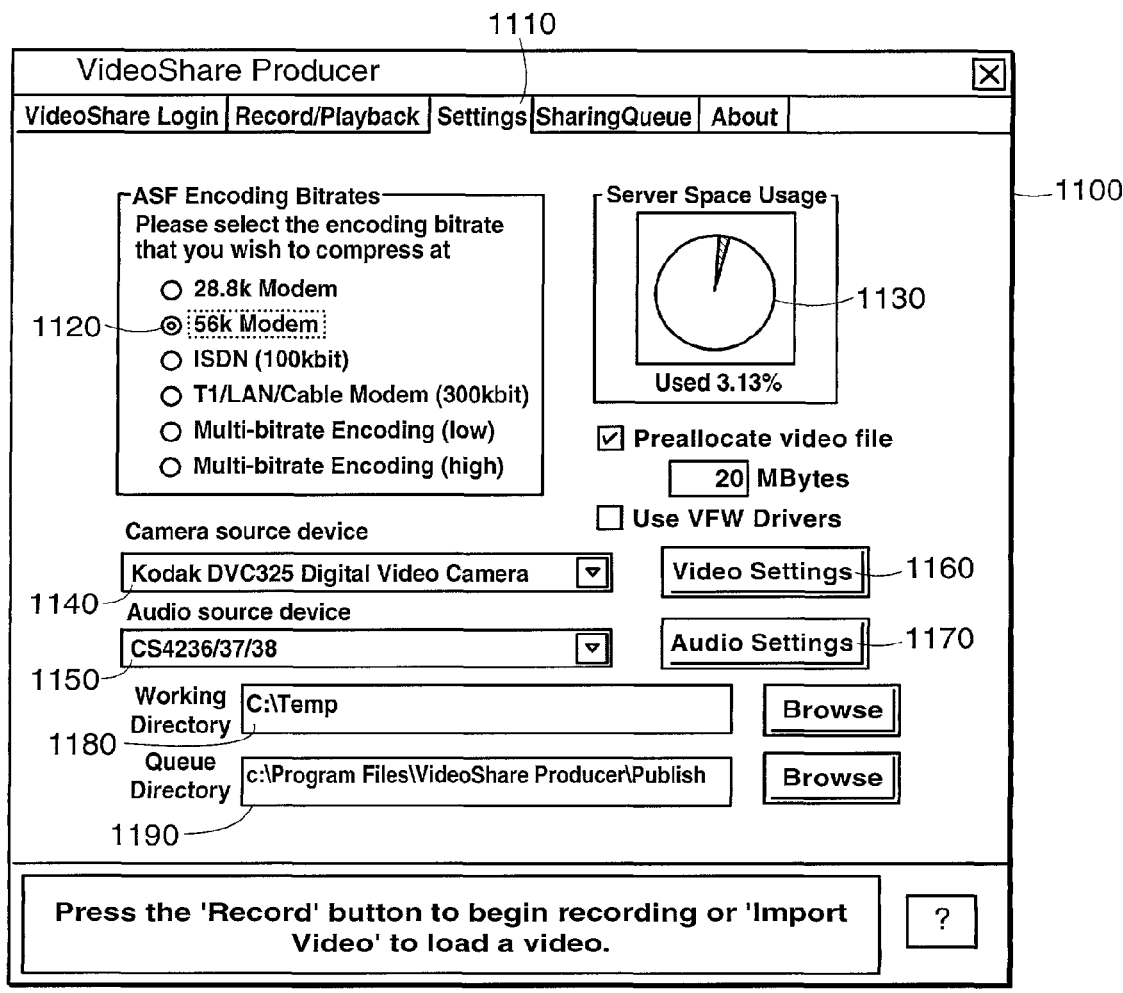
FIG. 11 is a screen used by the user to control the operational settings of equipment associated with the user's computer.

FIG. 11 shows a screen 1100 used to control the operational settings of equipment connected to the user's computer. Another feature of the VideoShare Producer 20 software the ability of the user to change the configuration of the audio, video, and compression devices through the use of the "Settings" tab 1110. Upon activation of the Settings tab 1110, the screen 1100 is active.

The user can select the "bitrate" at which the streaming multimedia files will be compressed by using the set of radio buttons 1120 at the upper left corner of the screen 1100. The default setting is "56 k Modem" which corresponds to a user using a 56 k modem. This default setting is denoted by the 56 k Modem radio button 1120 appearing with a dot, while the remaining radio buttons for bitrate 1120 are blank. In one embodiment, the pie graph 1130 that appears at the upper right corner of screen 1100 indicates the percentage of the user's VideoShare storage space that is full. In the embodiment shown, the user has filled approximately 3.13% of the available storage capacity available for storing files. Two pull-down menus, "Camera source device" box 1140 and "Audio source device" box 1150, list all of the available video and audio capture sources that the user has available on his or her Win9x/2000 machine. The user can select a source of audio or video by activating the appropriate pull-down menu box and locating a device of his or her choosing. To the right of these pull-down menus, there are two buttons, "Video Settings . . . " 1160 and "Audio Settings . . . " 1170 that allow the user to change the properties of the currently selected audio and video device. Such properties include image size, capture compression, lighting conditions, and the like. The screen 1100 also provides to the user the current working directory information in a the box 1180 and the current queue directory information in the box 1190, which the user can optionally change by entering new values in either or both boxes 1180 and 1190.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method comprising:
    performing by a first computer:
    (a) receiving a first video file from a first user on a second computer on a network;
    (b) automatically converting said first video file into a streaming video file comprising streaming video format, independent from receiving a command to perform said converting from said first user;
    (c) automatically generating an identification tag that (i) comprises an image representing a subject matter of said streaming video file and (ii) identifies said streaming video file;
    (d) embedding said identification tag in a first web page;
    (e) transmitting, via a second web page, said streaming video file to a second user on a third computer on a network.

2. The method of claim 1, wherein said first computer comprises a plurality of computers.

3. The method of claim 1, wherein said first computer comprises a web server.

4. The method of claim 1, wherein said second computer comprises a cellular telephone or PDA.

5. The method of claim 1, wherein two or more of steps (a), (b), (c), (d) and (e) are performed by different computers.

6. The method of claim 1, wherein each of steps (a), (b), (c), (d) and (e) are performed by a single computer.

7. The method of claim 1, wherein said first video file is a streaming video file in streaming video format.

8. The method of claim 1, wherein said first web page is the same web page as said second web page.

9. The method of claim 1, wherein said receiving is via a third web page.

10. The method of claim 9, wherein two or more of said first web page, second web page, and third web page are the same web page.

11. The method of claim 1 further comprising storing both the first video file and the streaming video file in streaming video format on the first computer.

12. A method comprising:
    performing by a first computer:
    (a) receiving a first video file from a first user on a second computer on a network;
    (b) automatically converting said first video file into a streaming video file comprising streaming video format, independent from receiving a command to perform said converting from said first user;
    (c) receiving an identification tag from said first user that (i) comprises an image representing a subject matter of said streaming video file and (ii) identifies said streaming video file;
    (d) embedding said identification tag in a first web page;
    (e) transmitting, via a second web page, said streaming video file to a second user on a third computer on a network.

13. The method of claim 12, wherein said first video file is a streaming video file in streaming video format.

14. A system comprising:
    (a) a first computer for receiving a first video file from a first user on a second computer on a network;
    (b) a third computer for automatically converting said video file into a streaming video file comprising streaming video format, independent of receiving a command to perform said converting from said first user;
    (c) a fourth computer for generating an identification tag that (i) comprises a video frame image representing the subject matter of said streaming video file and (ii) identifies said streaming video file;

(d) a fifth computer for embedding said identification tag into a first web page;

(e) a sixth computer for transmitting, via a second web page, said streaming video file to a second user on a computer on a network.

15. The system of claim 14, wherein said first video file is a streaming video file in streaming video format.

16. The system of claim 14, wherein two or more of said first computer, third computer, fourth computer, fifth computer, and sixth computer are the same computer.

17. The system of claim 14, wherein one or more of said first computer, third computer, fourth computer, fifth computer, and sixth computer comprise a plurality of computers.

18. The system of claim 14, wherein said first computer comprises a web server.

19. The system of claim 14, wherein said second computer comprises a cellular telephone or PDA.

20. The system of claim 14, wherein said first web page is the same web page as said second web page.

21. The system of claim 14, wherein said first computer is for receiving a video file via a third web page.

22. The system of claim 21, wherein two or more of said first web page, second web page, and third web page are the same web page.

* * * * *